US 6,699,648 B2

United States Patent
Sakizadeh et al.

(10) Patent No.: US 6,699,648 B2
(45) Date of Patent: Mar. 2, 2004

(54) MODIFIED ANTISTATIC COMPOSITIONS AND THERMALLY DEVELOPABLE MATERIALS CONTAINING SAME

(75) Inventors: Kumars Sakizadeh, Woodbury, MN (US); Gary E. LaBelle, Stillwater, MN (US); Michael W. Orem, Rochester, NY (US); Aparna V. Bhave, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/107,551

(22) Filed: Mar. 27, 2002

(65) Prior Publication Data

US 2003/0198901 A1 Oct. 23, 2003

(51) Int. Cl.$^7$ .......................... G03C 5/16; G03C 1/498; G03C 1/38
(52) U.S. Cl. .................. 430/350; 430/510; 430/523; 430/527; 430/531; 430/607; 430/609; 430/619; 430/620; 430/631; 430/965; 503/201
(58) Field of Search ................. 430/617, 607, 430/619, 523, 620, 631, 510, 527, 531, 528, 570, 264, 965, 350; 503/201

(56) References Cited

U.S. PATENT DOCUMENTS

| | | |
|---|---|---|
| 3,589,906 A | 6/1971 | McDowell |
| 3,666,478 A | 5/1972 | Bourguillon et al. |
| 3,884,699 A | 5/1975 | Cavallo et al. |
| 3,888,678 A | 6/1975 | Bailey, Jr. et al. |
| 4,330,618 A | 5/1982 | Minamizono et al. |
| 4,722,758 A | 2/1988 | Barrett et al. |
| 4,925,975 A | 5/1990 | Aramaki et al. |
| 4,975,363 A | 12/1990 | Cavallo et al. |
| 4,988,566 A | 1/1991 | Glaister |
| 5,109,071 A | 4/1992 | Johnson et al. |
| 5,380,644 A | 1/1995 | Yonkoski et al. |
| 5,468,603 A | 11/1995 | Kub |
| 5,532,121 A | 7/1996 | Yonkoski et al. |
| 5,547,821 A | 8/1996 | Melpolder et al. |
| 5,674,671 A | 10/1997 | Brandon et al. |
| 5,874,616 A | 2/1999 | Howells et al. |
| 6,117,624 A * | 9/2000 | Shor et al. .................. 430/350 |
| 6,171,707 B1 | 1/2001 | Gomez et al. |
| 6,171,797 B1 | 1/2001 | Perbost |
| 6,287,754 B1 | 9/2001 | Melpolder et al. |

FOREIGN PATENT DOCUMENTS

| | | |
|---|---|---|
| DE | 2632197 | 10/1977 |
| EP | 0 803 766 A1 | 10/1997 |
| EP | 0 663 612 B1 | 3/2000 |

* cited by examiner

*Primary Examiner*—Thorl Chea
(74) *Attorney, Agent, or Firm*—J. Lanny Tucker; Louis M. Leichter

(57) ABSTRACT

Antistatic compositions include a fluorochemical that is a reaction product of $R_f$—$CH_2CH_2$—$SO_3H$ with an amine wherein $R_f$ comprises 4 or more fully fluorinated carbon atoms. These antistatic compositions can be formulated in organic solvent-based conductive coating compositions, with or without hydrophobic binders, that can be used to form conductive layers in thermally developable materials including thermographic and photothermographic materials.

32 Claims, No Drawings

MODIFIED ANTISTATIC COMPOSITIONS AND THERMALLY DEVELOPABLE MATERIALS CONTAINING SAME

FIELD OF THE INVENTION

This invention relates to antistatic compositions comprising modified fluorochemicals and thermally developable materials containing such compounds. In particular, the invention relates to thermographic and photothermographic materials containing the modified fluorochemicals in conductive layers. The invention also relates to methods of imaging the thermally developable materials.

BACKGROUND OF THE INVENTION

Silver-containing thermographic and photothermographic imaging materials (that is, thermally developable imaging materials) that are imaged and/or developed using heat and without liquid processing have been known in the art for many years.

Silver-containing thermographic imaging materials are non-photosensitive materials that are used in a recording process wherein images are generated by the use of thermal energy. These materials generally comprise a support having disposed thereon (a) a relatively or completely non-photosensitive source of reducible silver ions, (b) a reducing composition (usually including a developer) for the reducible silver ions, and (c) a suitable hydrophilic or hydrophobic binder.

In a typical thermographic construction, the image-forming layers are based on silver salts of long chain fatty acids. Typically, the preferred non-photosensitive reducible silver source is a silver salt of a long chain aliphatic carboxylic acid having from 10 to 30 carbon atoms. The silver salt of behenic acid or mixtures of acids of similar molecular weight are generally used. At elevated temperatures, silver behenate is reduced by a reducing agent for silver ion such as methyl gallate, hydroquinone, substituted-hydroquinones, hindered phenols, catechols, pyrogallol, ascorbic acid, and ascorbic acid derivatives, whereby an image of elemental silver is formed. Some thermographic constructions are imaged by contacting them with the thermal head of a thermographic recording apparatus such as a thermal printer or thermal facsimile. In such, an anti-stick layer is coated on top of the imaging layer to prevent sticking of the thermographic construction to the thermal head of the apparatus utilized. The resulting thermographic construction is then heated to an elevated temperature, typically in the range of from about 60 to about 225° C., resulting in the formation of an image.

Silver-containing photothermographic imaging materials are photosensitive materials that are used in a recording process wherein an image is formed by imagewise exposure of the photothermographic material to specific electromagnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (usually including a developer) for the reducible silver ions, and (d) a hydrophilic or hydrophobic binder. The latent image is then developed by application of thermal energy.

In such materials, the photosensitive catalyst is generally a photographic type photosensitive silver halide that is considered to be in catalytic proximity to the non-photosensitive source of reducible silver ions. Catalytic proximity requires intimate physical association of these two components either prior to or during the thermal image development process so that when silver atoms $(Ag^0)_n$, also known as silver specks, clusters, nuclei or latent image, are generated by irradiation or light exposure of the photosensitive silver halide, those silver atoms are able to catalyze the reduction of the reducible silver ions within a catalytic sphere of influence around the silver atoms [D. H. Klosterboer, *Imaging Processes and Materials*, (*Neblette's Eighth Edition*), J. Sturge, V. Walworth, and A. Shepp, Eds., Van Nostrand-Reinhold, New York, 1989, Chapter 9, pp. 279–291]. It has long been understood that silver atoms act as a catalyst for the reduction of silver ions, and that the photosensitive silver halide can be placed in catalytic proximity with the non-photosensitive source of reducible silver ions in a number of different ways (see, for example, *Research Disclosure*, June 1978, item 17029). Other photosensitive materials, such as titanium dioxide, cadmium sulfide, and zinc oxide have also been reported to be useful in place of silver halide as the photocatalyst in photothermographic materials [see for example, Shepard, *J. Appl. Photog. Eng.* 1982, 8(5), 210–212, Shigeo et al., *Nippon Kagaku Kaishi*, 1994, 11, 992–997, and FR 2,254,047 (Robillard)].

The photosensitive silver halide may be made "in situ," for example by mixing an organic or inorganic halide-containing source with a source of reducible silver ions to achieve partial metathesis and thus causing the in situ formation of silver halide (AgX) grains throughout the silver source [see, for example, U.S. Pat. No. 3,457,075 (Morgan et al.)]. In addition, photosensitive silver halides and sources of reducible silver ions can be coprecipitated [see Yu. E. Usanov et al., *J. Imag. Sci. Tech.* 1996, 40, 104]. Alternatively, a portion of the reducible silver ions can be completely converted to silver halide, and that portion can be added back to the source of reducible silver ions (see Yu. E. Usanov et al., International Conference on Imaging Science, Sep. 7–11, 1998).

The silver halide may also be "preformed" and prepared by an "ex situ" process whereby the silver halide (AgX) grains are prepared and grown separately. With this technique, one has the possibility of controlling the grain size, grain size distribution, dopant levels, and composition much more precisely, so that one can impart more specific properties to both the silver halide grains and the photothermographic material. The preformed silver halide grains may be introduced prior to and be present during the formation of the source of reducible silver ions. Co-precipitation of the silver halide and the source of reducible silver ions provides a more intimate mixture of the two materials [see for example U.S. Pat. No. 3,839,049 (Simons)]. Alternatively, the preformed silver halide grains may be added to and physically mixed with the source of reducible silver ions.

The non-photosensitive source of reducible silver ions is a material that contains reducible silver ions. Typically, the preferred non-photosensitive source of reducible silver ions is a silver salt of a long chain aliphatic carboxylic acid having from 10 to 30 carbon atoms, or mixtures of such salts. Such acids are also known as "fatty acids" or "fatty carboxylic acids". Silver salts of other organic acids or other organic compounds, such as silver imidazoles, silver tetrazoles, silver benzotriazoles, silver benzotetrazoles, silver benzothiazoles and silver acetylides may also be used. U.S. Pat. No. 4,260,677 (Winslow et al.) discloses the use of complexes of various inorganic or organic silver salts.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black-and-white image. The non-photosensitive silver source is catalytically reduced to form the visible black-and-white negative image while much of the silver halide, generally, remains as silver halide and is not reduced.

In photothermographic materials, the reducing agent for the reducible silver ions, often referred to as a "developer," may be any compound that, in the presence of the latent image, can reduce silver ion to metallic silver and is preferably of relatively low activity until it is heated to a temperature sufficient to cause the reaction. A wide variety of classes of compounds have been disclosed in the literature that function as developers for photothermographic materials. At elevated temperatures, the reducible silver ions are reduced by the reducing agent. In photothermographic materials, upon heating, this reaction occurs preferentially in the regions surrounding the latent image. This reaction produces a negative image of metallic silver having a color that ranges from yellow to deep black depending upon the presence of toning agents and other components in the imaging layer(s).

Differences Between Photothermography and Photography

The imaging arts have long recognized that the field of photo-thermography is clearly distinct from that of photography. Photothermographic materials differ significantly from conventional silver halide photographic materials that require processing with aqueous processing solutions.

As noted above, in photothermographic imaging materials, a visible image is created by heat as a result of the reaction of a developer incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example a silver carboxylate) is used to generate the visible image using thermal development. Thus, the imaged photosensitive silver halide serves as a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a developer (that is, a reducing agent for the reducible silver ions) while conventional photographic materials usually do not. Even in so-called "instant photography," the developer chemistry is physically separated from the photosensitive silver halide until development is desired. The incorporation of the developer into photothermographic materials can lead to increased formation of various types of "fog" or other undesirable sensitometric side effects. Therefore, much effort has gone into the preparation and manufacture of photothermographic materials to minimize these problems during the preparation of the photothermographic emulsion as well as during coating, use, storage, and post-processing handling.

Moreover, in photothermographic materials, the unexposed silver halide generally remains intact after development and the material must be stabilized against further imaging and development. In contrast, silver halide is removed from conventional photographic materials after solution development to prevent further imaging (that is in the aqueous fixing step).

In photothermographic materials, the binder is capable of wide variation and a number of binders (both hydrophilic and hydrophobic) are useful. In contrast, conventional photographic materials are limited almost exclusively to hydrophilic colloidal binders such as gelatin.

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the underlying chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic materials to be inactive in photothermographic materials.

These and other distinctions between photothermographic and photographic materials are described in *Imaging Processes and Materials* (*Neblette's Eighth Edition*), noted above, *Unconventional Imaging Processes*, E. Brinckman et al. (Eds.), The Focal Press, London and New York, 1978, pp. 74–75, in Zou et al., *J. Imaging Sci. Technol.* 1996, 40, pp. 94–103, and in M. R. V. Sahyun, *J. Imaging Sci. Technol.* 1998, 42, 23.

Problem to be Solved

Many of the chemicals used to make supports or supported layers in thermally developable materials have electrically insulating properties, and electrostatic charges frequently build up on the materials during manufacture, packaging, and use. The accumulated charges can cause various problems. For example, in photothermographic materials containing photosensitive silver halides, accumulated electrostatic charge can generate light to which the silver halides are sensitive. This may result in imaging defects that are a particular problem where the images are used for medical diagnosis.

Build-up of electrostatic charge can also cause sheets of imageable material to stick together causing mis-feeds and jamming within processing equipment. Additionally, accumulated electrostatic charge can attract dust or other particulate matter to the imageable material, thereby requiring more cleaning means so transport through the processing equipment and image quality of the material are not diminished.

Build-up of electrostatic charge also makes handling of developed sheets of imaged material more difficult. For example, a radiologist desires a static free sheet for viewing on the light boxes. This problem can be particularly severe when reviewing an imaged film that has been stored for later review. Many antistatic materials loose their effectiveness over time.

In general, electrostatic charge is related to surface resistivity (measured in ohm/sq) and charge level. Thus, while electrostatic charge control agents (or antistatic agents) can be included in any layer of an imaging material, the accumulation of electrostatic charge can be prevented by reducing the surface resistivity or by lowering the charge level, and this is usually done by including charge control agents in surface layers. Such surface layers may include what are known as "protective" overcoats or various backing layers in imaging materials. In thermographic and photothermographic materials, charge control agents may be incorporated into backing layers (such as antihalation layers of photothermographic materials) that are on the opposite side of the support as the imaging layers.

A wide variety of charge control agents, both inorganic and organic, have been devised and used for electrostatic charge control and numerous publications exist to describe such agents. Some of these agents are designed to increase surface layer conductivity while others are designed to control the generation of surface electrostatic charge. Various fluorochemicals have been widely used for the purpose of reducing the generation of surface electrostatic charge. U.S. Pat. No. 5,674,671 (Brandon et al.), for example, describes the use of certain fluoropolymers and non-polymeric fluorochemicals for this purpose in photographic materials (not thermally developable materials). The disclosed materials include ammonium salts of perfluoroalkyl or fluorinated alkyl sulfonates and carboxylates.

U.S. Pat. No. 6,287,754 (Melpolder et al.) describes thermally developable materials (both thermographic and photothermographic materials) that include fluorosurfactants as electroconductive agents in either of both of the protective overcoat layers and backing layers. The fluorosurfactants can be either nonionic or ionic in nature and generally include one or more aliphatic or polyalkylether chains. Some of these compounds are the commercially available Fluorad™ FC-135 cationic fluorosurfactant (3M Corporation) that is a fluorinated alkyl quaternary ammonium iodide and ZONYL® FSN nonionic fluorosurfactant (E. I. DuPont de Nemours & Co.) that is a fluorinated polyethyleneoxide alcohol.

Fluorinated organic salts that are the reaction products of a polyoxyalkyleneamine with a fluorinated organic acid have also been described as electrostatic charge control agents in non-thermally developable photographic materials in U.S. Pat. No. 4,975,363 (Cavallo et al.). Polyoxyalkyleneamines that are useful for making such fluorinated organic salts include JEFFAMINE® polyoxyalkyleneamines (currently available from Huntsman Corp. and previously available from Texaco Chemical Co.). These materials require isolation and purification.

U.S. Pat. No. 6,171,797 (Gomez et al.) describes the use of di-quaternary nitrogen polyoxyalkylene compounds having highly fluorinated alkylsulfonyl anions as antistatic agents in backing layers of photothermographic materials. The preferred compound of this class contains a $C_8F_{17}SO_3^-$ (perfluorooctylsulfonic acid) group on each end.

More recently, DryView® photothermographic films that are commercially available from Eastman Kodak Company include an antistatic compound that is a reaction product of perfluorooctylsulfonic acid and JEFFAMINE® ED-600 polyoxyalkyleneamine. However, it has been learned that this compound may present environmental concerns.

In an attempt to provide an alternative antistatic agent, various other known fluorochemicals were investigated including ZONYL® FS-62 anionic fluorosurfactant (E. I. DuPont de Nemours & Co.) that is a mixture of perfluoroalkylsulfonic acids. A major problem associated with this compound, however, is that it can cause cellulose acetate resins such as cellulose acetate butyrate (CAB, often used as binders) to undergo hydrolysis over time during normal storage. This hydrolysis releases acids such as butyric acid from the film and into the user's environment with the accompanying strong objectionable odor. An additional problem with ZONYL® FS-62 is that it provides poor coating quality and unacceptable antistatic properties when used in photothermographic materials coated from organic solvents.

There remains a need for environmentally acceptable antistatic materials for thermally developable imaging materials.

SUMMARY OF THE INVENTION

This invention provides an antistatic composition comprising one or more solvents, at least 50 volume % being organic solvent(s), and a fluorochemical that is a reaction product of $R_f$—$CH_2CH_2$—$SO_3H$ with an amine wherein $R_f$ comprises 4 or more fully fluorinated carbon atoms.

In addition, this invention provides a thermally developable material comprising a support and having thereon at least one thermally developable layer, and a first conductive layer comprising a fluorochemical that is a reaction product of $R_f$—$CH_2CH_2$—$SO_3H$ with an amine wherein $R_f$ comprises 4 or more fully fluorinated carbon atoms.

This invention also provides a thermographic material that comprises a support having thereon one or more thermally-developable imaging layers comprising a binder and in reactive association, a non-photosensitive source of reducible silver ions, and a reducing composition for the non-photosensitive source of reducible silver ions, and a first conductive layer comprising a fluorochemical that is a reaction product of $R_f$—$CH_2CH_2$—$SO_3H$ with an amine wherein $R_f$ comprises 4 or more fully fluorinated carbon atoms.

Such thermally developable materials can be used according to this invention to provide a visible image during thermal imaging and/or development.

Thus, this invention provides a method of forming a visible image comprising:

A) thermal imaging of the thermographic material described above to form a visible image.

In some embodiments, wherein the thermographic material comprises a transparent support, the image-forming method further comprises:

B) positioning the thermal imaged thermographic material between a source of imaging radiation and an imageable material that is sensitive to the imaging radiation, and C) exposing the imageable material to the imaging radiation through the visible image in the thermal imaged thermographic material to provide an image in the imageable material.

Particularly preferred embodiments of this invention also include black-and-white thermographic materials that comprise a support having thereon:

a) one or more thermally developable imaging layers each comprising a binder, and in reactive association,
   a non-photosensitive source of reducible silver ions that includes one or more silver carboxylates at least one of which is silver behenate,
   a reducing composition for said non-photosensitive source reducible silver ions that includes at least one di- or tri-hydroxy compound having at least two hydroxy groups in ortho- or para-relationship on the same aromatic nucleus,
   at least one toner, antifoggant, or high contrast agent, or any combination thereof, b) a protective overcoat disposed over said one or more thermally developable imaging layers, and c) on the backside, a first conductive layer comprising a fluorochemical that is a reaction product of $R_f$—$CH_2CH_2$—$SO_3H$ with a polyoxyalkylenediamine wherein $R_f$ comprises a single fully fluorinated fluoroalkyl chain comprising 6, 8, or 10 carbon atoms, or a mixture of two or more fluorochemicals that are reaction products of the same or different $R_f$—$CH_2CH_2$—$SO_3H$ with the same or different polyoxyalkylenediamine.

Additionally, this invention provides a photothermographic material that comprises a support having thereon one or more thermally-developable imaging layers comprising a binder and in reactive association, a photosensitive silver halide, a non-photosensitive source of reducible silver ions, and a reducing composition for the non-photosensitive source of reducible silver ions, and a first conductive layer comprising a fluorochemical that is a reaction product of $R_f$—$CH_2CH_2$—$SO_3H$ with an amine wherein $R_f$ comprises 4 or more fully fluorinated carbon atoms.

Further still, this invention provides a method of forming a visible image comprising:

A) imagewise exposing the photothermographic material described above to electromagnetic radiation to form a latent image, and B) simultaneously or sequentially, heating the exposed photothermographic material to develop the latent image into a visible image.

In some embodiments, wherein the photothermographic material comprises a transparent support, the image-forming method further comprises:

C) positioning the exposed and heat-developed photothermographic material with the visible image thereon between a source of imaging radiation and an imageable material that is sensitive to the imaging radiation, and D) exposing the imageable material to the imaging radiation through the visible image in the exposed and heat-developed photothermographic material to provide an image in the imageable material.

Particularly preferred embodiments of this invention include black-and-white photothermographic materials that comprise a support having thereon:

a) one or more thermally developable imaging layers each comprising a binder, and in reactive association,
   a photosensitive silver bromide or silver iodobromide,
   a non-photosensitive source of reducible silver ions that includes one or more silver carboxylates at least one of which is silver behenate,
   a reducing composition for the non-photosensitive source reducible silver ions that includes at least one hindered phenol, and
   at least one toner, antifoggant, spectral sensitizing dye, or high contrast agent, or any combination thereof, b) a protective overcoat disposed over the one or more thermally developable imaging layers, c) on the backside, a first conductive layer comprising a fluorochemical that is a reaction product of $R_f$—$CH_2CH_2$—$SO_3H$ with a polyoxyalkylenediamine wherein $R_f$ comprises a single fully fluorinated fluoroalkyl chain comprising 6, 8, or 10 carbon atoms, or a mixture of two or more fluorochemicals that are reaction products of the same or different $R_f$—$CH_2CH_2$—$SO_3H$ with the same or different polyoxyalkylenediamine, and d) also on the backside, an antihalation layer disposed over the first conductive layer.

The present invention provides a number of advantages with the use of unique modified fluorochemicals. As noted above, there are many fluorochemicals that are known to be useful as antistatic agents in imaging materials, especially imaging materials that are processed using aqueous photoprocessing compositions. Some of these fluorochemicals are soluble in water while others are soluble in organic solvents.

The present invention provides materials that reduce build-up of electrostatic charge, thus reducing the tendency of sheets of imageable material to stick together and to cause mis-feeds and jamming within processing equipment. The present invention further provides materials with a reduced tendency to attract dust or other particulate matter. The present invention also makes handling of developed sheets of imaged material easier because they do not lose their antistatic properties over time.

The present invention also provides a method for preparing antistatic materials without the need for their isolation and purification.

While the conventional ZONYL® FS-62 anionic fluorosurfactant is a useful wetting agent even at low concentrations in aqueous environments, the release of butyric acid (when the fluorosurfactant is used in cellulose butyrate binder) during thermal imaging and/or development is a serious concern. The present invention provides an antistatic composition that does not exhibit this problem and provides more environmentally useful conductive compositions. It also provides more flexibility in the choice of binder materials. These advantages are achieved by converting the acidic portions of the fluorochemicals into quaternary ammonium salts using a reactive amine, preferably a reactive aliphatic amine, and more preferably a polyoxyalkylene diamine, thereby providing a fluorochemical material that exhibits improved conductivity, improved coatability, and compatibility with hydrophobic binders and organic solvent-based imaging systems, without generating undesirable odor resulting from the hydrolysis of the binder.

DETAILED DESCRIPTION OF THE INVENTION

The thermally developable materials of this invention include both thermographic and photothermographic materials. While the following discussion will be directed primarily to the preferred photothermographic embodiments, it would be readily understood by one skilled in the imaging arts that thermographic materials can be similarly constructed (using one or more imaging layers) and used to provide black-and-white or color images using nonphotosensitive silver salts, reducing compositions, binders, and other components known to be used in such embodiments. In both types of thermally developable materials, the antistatic compositions of this invention are generally incorporated into a separate conductive ("antistatic") layer on either or both sides of the support.

The thermographic and photothermographic materials of this invention can be used in black-and-white or color photothermography and in electronically generated black-and-white or color hardcopy recording. They can be used in microfilm applications, in radiographic imaging (for example digital medical imaging), X-ray radiography, and in industrial radiography. Furthermore, the absorbance of these photothermographic materials between 350 and 450 nm is desirably low (less than 0.5), to permit their use in the graphic arts area (for example, imagesetting and phototypesetting), in the manufacture of printing plates, in contact printing, in duplicating ("duping"), and in proofing. The thermographic and photothermographic materials of this invention are particularly useful for medical, dental, and veterinary radiography to provide black-and-white images.

The photothermographic materials of this invention can be made sensitive to radiation of any suitable wavelength. Thus, in some embodiments, the materials are sensitive at ultraviolet, visible, infrared or near infrared wavelengths, of the electromagnetic spectrum. In other embodiments they are sensitive to X-radiation.

The materials of this invention are also useful for non-medical uses of visible or X-radiation (such as X-ray lithography and industrial radiography). In such imaging applications, it is particularly desirable that the photothermographic materials be "double-sided".

In the photothermographic materials of this invention, the components needed for imaging can be in one or more layers. The layer(s) that contain the photosensitive photocatalyst (such as a photosensitive silver halide) or non-photosensitive source of reducible silver ions, or both, are referred to herein as photothermographic emulsion layer(s). The photocatalyst and the non-photosensitive source of reducible silver ions are in catalytic proximity (that is, in reactive association with each other) and preferably are in the same emulsion layer.

Where the materials contain imaging layers on one side of the support only, various non-imaging layers are usually disposed on the "backside" (non-emulsion or non-imaging side) of the materials, including antihalation layer(s), protective layers, antistatic layers, conducting layers, and transport enabling layers.

In such instances, various non-imaging layers can also be disposed on the "frontside" or imaging or emulsion side of the support, including protective topcoat layers, primer layers, interlayers, opacifying layers, antistatic layers, antihalation layers, acutance layers, auxiliary layers, and other layers readily apparent to one skilled in the art.

If the photothermographic materials comprise one or more thermally developable imaging layers on both sides of the support, each side can also include one or more protective topcoat layers, primer layers, interlayers, antistatic layers, acutance layers, auxiliary layers, anti-crossover layers, and other layers readily apparent to one skilled in the art.

When the photothermographic materials of this invention are heat-developed as described below in a substantially water-free condition after, or simultaneously with, image-wise exposure, a silver image (preferably a black-and-white silver image) is obtained.

Definitions

As used herein:

In the descriptions of the photothermographic materials of the present invention, "a" or "an" component refers to "at least one" of that component (for example, the mercaptotriazine toners).

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Thermographic material(s)" means a construction comprising at least one thermographic emulsion layer or a set of imaging layers (wherein the source of reducible silver ions is in one layer and the other essential components or desirable additives are distributed, as desired, in an adjacent coating layer) and any supports, topcoat layers, image-receiving layers, blocking layers, and subbing or priming layers. These materials also include multilayer constructions in which one or more imaging components are in different layers, but are in "reactive association" so that they readily come into contact with each other during thermal imaging and development. For example, one layer can include the non-photosensitive source of reducible silver ions and another layer can include the reducing composition, but the two reactive components are in reactive association with each other.

"Photothermographic material(s)" means a construction comprising at least one photothermographic emulsion layer or a photothermographic set of layers (wherein the silver halide and the source of reducible silver ions are in one layer and the other essential components or desirable additives are distributed, as desired, in an adjacent coating layer) and any supports, topcoat layers, image-receiving layers, blocking layers, antihalation layers, subbing or priming layers. These materials also include multilayer constructions in which one or more imaging components are in different layers, but are in "reactive association" so that they readily come into contact with each other during imaging and/or development. For example, one layer can include the non-photosensitive source of reducible silver ions and another layer can include the reducing composition, but the two reactive components are in reactive association with each other.

"Catalytic proximity" or "reactive association" means that the materials are in the same layer or in adjacent layers so that they readily come into contact with each other during thermal imaging and development.

"Emulsion layer", "imaging layer", or "photothermographic emulsion layer" means a layer of a photothermographic material that contains the photosensitive silver halide and/or non-photosensitive source of reducible silver ions. It can also mean a layer of the photothermographic material that contains, in addition to the photosensitive silver halide and/or non-photosensitive source of reducible ions, additional essential components and/or desirable additives. These layers are usually on what is known as the "frontside" of the support.

"Photocatalyst" means a photosensitive compound such as silver halide that, upon exposure to radiation, provides a compound that is capable of acting as a catalyst for the subsequent development of the image-forming material.

Many of the materials used herein are provided as a solution. The term "active ingredient" means the percentage of the desired material contained in a sample. For example, ZONYL® FS-62 is provided as a 25% solution in water. Thus it contains 25% of the "active ingredient".

"Ultraviolet region of the spectrum" refers to that region of the spectrum less than or equal to 410 nm, and preferably from about 100 nm to about 410 nm, although parts of these ranges may be visible to the naked human eye. More preferably, the ultraviolet region of the spectrum is the region of from about 190 to about 405 nm.

"Visible region of the spectrum" refers to that region of the spectrum of from about 400 nm to about 700 nm.

"Short wavelength visible region of the spectrum" refers to that region of the spectrum of from about 400 nm to about 450 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

The sensitometric terms "photospeed" or "photographic speed", $D_{min}$, and $D_{max}$ have conventional definitions known in the imaging arts.

"Transparent" means capable of transmitting visible light or imaging radiation without appreciable scattering or absorption.

In the compounds described herein, no particular double bond geometry (for example, cis or trans) is intended by the structures drawn. Similarly, in compounds having alternating single and double bonds and localized charges are drawn as a formalism. In reality, both electron and charge delocalization exists throughout the conjugated chain.

As is well understood in this art, for the chemical compounds herein described, substitution is not only tolerated, but is often advisable and various substituents are anticipated on the compounds used in the present invention unless otherwise stated. Thus, when a compound is referred to as "having the structure" of a given formula, any substitution that does not alter the bond structure of the formula or the shown atoms within that structure is included within the formula, unless such substitution is specifically excluded by language (such as "free of carboxy-substituted alkyl"). For example, where a benzene ring structure is shown (including fused ring structures), substituent groups may be placed on the benzene ring structure, but the atoms making up the benzene ring structure may not be replaced.

As a means of simplifying the discussion and recitation of certain substituent groups, the term "group" refers to chemical species that may be substituted as well as those that are not so substituted. Thus, the term "group," such as "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, and I), cyano, nitro, amino, and carboxy. For example, alkyl group includes ether and thioether groups (for example $CH_3$—$CH_2$—$CH_2$—O—$CH_2$— and $CH_3$—$CH_2$—$CH_2$—S—$CH_2$—), haloalkyl, nitroalkyl, alkylcarboxy, carboxyalkyl, carboxamido, hydroxyalkyl, sulfoalkyl, and other groups readily apparent to one skilled in the art. Substituents that adversely react with other active ingredients, such as very strongly electrophilic or oxidizing substituents, would, of course, be excluded by the ordinarily skilled artisan as not being inert or harmless.

*Research Disclosure* is a publication of Kenneth Mason Publications Ltd., Dudley House, 12 North Street, Emsworth, Hampshire PO10 7DQ England (also available from Emsworth Design Inc., 147 West 24th Street, New York, N.Y. 10011).

Other aspects, advantages, and benefits of the present invention are apparent from the detailed description, examples, and claims provided in this application.

The Photocatalyst

As noted above, the photothermographic materials of the present invention include one or more photocatalysts in the photothermographic emulsion layer(s). Useful photocatalysts are typically silver halides such as silver bromide, silver iodide, silver chloride, silver bromoiodide, silver chlorobromoiodide, silver chlorobromide, and others readily apparent to one skilled in the art. Mixtures of silver halides can also be used in any suitable proportion. Silver bromide and silver bromoiodide are more preferred, with the latter silver halide generally having up to 10 mol % silver iodide. Typical techniques for preparing and precipitating silver halide grains are described in *Research Disclosure*, 1978, Item 17643.

The shape of the photosensitive silver halide grains used in the present invention is in no way limited. The silver halide grains may have any crystalline habit including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of these crystals can be employed. Silver halide grains having cubic and tabular morphology are preferred.

The silver halide grains may have a uniform ratio of halide throughout. They may have a graded halide content, with a continuously varying ratio of, for example, silver bromide and silver iodide or they may be of the core-shell type, having a discrete core of one halide ratio, and a discrete shell of another halide ratio. Core-shell silver halide grains useful in photothermographic materials and methods of preparing these materials are described for example in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference.

The photosensitive silver halide can be added to (or formed within) the emulsion layer(s) in any fashion as long as it is placed in catalytic proximity to the non-photosensitive source of reducible silver ions.

It is preferred that the silver halides be preformed and prepared by an ex-situ process. The silver halide grains prepared ex-situ may then be added to and physically mixed with the non-photosensitive source of reducible silver ions. It is more preferable to form the source of reducible silver ions in the presence of ex-situ-prepared silver halide. In this process, the source of reducible silver ions, such as a long chain fatty acid silver carboxylate (commonly referred to as a silver "soap"), is formed in the presence of the preformed silver halide grains. Co-precipitation of the reducible source of silver ions in the presence of silver halide provides a more intimate mixture of the two materials [see, for example U.S. Pat. No. 3,839,049 (Simons)]. Materials of this type are often referred to as "preformed soaps".

The silver halide grains used in the imaging formulations can vary in average diameter of up to several micrometers (μm) depending on their desired use. Preferred silver halide grains are those having an average particle size of from about 0.01 to about 1.5 μm, more preferred are those having an average particle size of from about 0.03 to about 1.0 μm, and most preferred are those having an average particle size of from about 0.05 to about 0.8 μm. Those of ordinary skill in the art understand that there is a finite lower practical limit for silver halide grains that is partially dependent upon the wavelengths to which the grains are spectrally sensitized. Such a lower limit, for example, is typically from about 0.01 to about 0.005 μm.

The average size of the photosensitive doped silver halide grains is expressed by the average diameter if the grains are spherical, and by the average of the diameters of equivalent circles for the projected images if the grains are cubic or in other non-spherical shapes.

Grain size may be determined by any of the methods commonly employed in the art for particle size measurement. Representative methods are described by in "Particle Size Analysis," ASTM Symposium on Light Microscopy, R. P. Loveland, 1955, pp. 94–122, and in C. E. K. Mees and T. H. James, *The Theory of the Photographic Process*, Third Edition, Macmillan, N.Y., 1966, Chapter 2. Particle size measurements may be expressed in terms of the projected areas of grains or approximations of their diameters. These will provide reasonably accurate results if the grains of interest are substantially uniform in shape.

Preformed silver halide emulsions used in the material of this invention can be prepared by aqueous or organic processes and can be unwashed or washed to remove soluble salts. In the latter case, the soluble salts can be removed by ultrafiltration, by chill setting and leaching, or by washing the coagulum [for example, by the procedures described in U.S. Pat. No. 2,618,556 (Hewitson et al.), U.S. Pat. No. 2,614,928 (Yutzy et al.), U.S. Pat. No. 2,565,418 (Yackel), U.S. Pat. No. 3,241,969 (Hart et al.), and U.S. Pat. No. 2,489,341 (Waller et al.)].

It is also effective to use an in situ process in which a halide-containing compound is added to an organic silver salt to partially convert the silver of the organic silver salt to silver halide. The halogen-containing compound can be inorganic (such as zinc bromide or lithium bromide) or organic (such as N-bromosuccinimide).

It is also effective to use mixtures of both preformed and in-situ generated silver halide.

Additional methods of preparing these silver halide and organic silver salts and manners of blending them are described in *Research Disclosure*, June 1978, item 17029, U.S. Pat. No. 3,700,458 (Lindholm), U.S. Pat. No. 4,076,539 (Ikenoue et al.), and JP Applications 13224/74, 42529/76, and 17216/75.

In some instances, it may be helpful to prepare the photosensitive silver halide grains in the presence of a hydroxytetrazindene (such as 4-hydroxy-6-methyl-1,3,3a,7-tetrazaindene or an N-heterocyclic compound comprising at least one mercapto group (such as 1-phenyl-5-mercaptotetrazole) to provide increased photospeed. Details of this procedure are provided in U.S. Pat. No. 6,413,710 (Shor et al.) that is incorporated herein by reference.

The one or more light-sensitive silver halides used in the photothermographic materials of the present invention are preferably present in an amount of from about 0.005 to about 0.5 mole, more preferably from about 0.01 to about 0.25 mole, and most preferably from about 0.03 to about 0.15 mole, per mole of non-photosensitive source of reducible silver ions.

Chemical Sensitizers

The photosensitive silver halides used in photothermographic features of the invention may be may be employed without modification. However, one or more conventional chemical sensitizers may be used in the preparation of the photosensitive silver halides to increase photospeed. Such compounds may contain sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149–169. Suitable conventional chemical sensitization procedures are also described in U.S. Pat. No. 1,623,499 (Sheppard et al.), U.S. Pat. No. 2,399,083 (Waller et al.), U.S. Pat. No. 3,297,447 (McVeigh), U.S. Pat. No. 3,297,446 (Dunn), U.S. Pat. No. 5,049,485 (Deaton), U.S. Pat. No. 5,252,455 (Deaton), U.S. Pat. No. 5,391,727 (Deaton), U.S. Pat. No. 5,912,111 (Lok et al.), U.S. Pat. No. 5,759,761 (Lushington et al.), and EP-A-0 915,371 (Lok et al.).

In addition, mercaptotetrazoles and tetraazindenes as described in U.S. Pat. No. 5,691,127 (Daubendiek et al.), incorporated herein by reference, can be used as suitable addenda for tabular silver halide grains.

When used, sulfur sensitization is usually performed by adding a sulfur sensitizer and stirring the emulsion at an appropriate temperature predetermined time. Examples of sulfur sensitizers include compounds such as thiosulfates, thioureas, thiazoles, rhodanines, thiosulfates and thioureas. In one preferred embodiment, chemical sensitization is achieved by oxidative decomposition of a sulfur-containing spectral sensitizing dye in the presence of a photothermographic emulsion. Such sensitization is described in U.S. Pat. No. 5,891,615 (Winslow et al.), incorporated herein by reference.

In another embodiment, certain substituted and unsubstituted thiourea compounds can be used as chemical sensitizers. Particularly useful tetra-substituted thioureas are described in U.S. Pat. No. 6,368,779 (Lynch et al.), that is incorporated herein by reference.

Other useful chemical sensitizers include certain tellurium-containing compounds that are described in copending and commonly assigned U.S. Ser. No. 09/975,909 (filed Oct. 11, 2001 by Lynch, Opatz, Shor, Simpson, Willett, and Gysling), that is incorporated herein by reference.

Combinations of gold (3+)-containing compounds and either sulfur- or tellurium-containing compounds are also useful as chemical sensitizers as described in U.S. Pat. No. 6,423,481 (Simpson et al.), that is also incorporated herein by reference.

Still other useful chemical sensitizers include certain selenium-containing compounds that are described in copending and commonly assigned U.S. Ser. No. 10/082,516 (filed Feb. 25, 2002 by Lynch, Opatz, Gysling, and Simpson), that is also incorporated herein by reference.

The chemical sensitizers can be used in making the silver halide emulsions in conventional amounts that generally depend upon the average size of the silver halide grains. Generally, the total amount is at least $10^{-10}$ mole per mole of total silver, and preferably from about $10^{-8}$ to about $10^{-2}$ mole per mole of total silver for silver halide grains having an average size of from about 0.01 to about 2 μm. The upper limit can vary depending upon the compound(s) used, the level of silver halide and the average grain size, and would be readily determinable by one of ordinary skill in the art.

Spectral Sensitizers

The photosensitive silver halides may be spectrally sensitized with various spectral sensitizing dyes that are known to enhance silver halide sensitivity to ultraviolet, visible, and/or infrared radiation. Non-limiting examples of sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. Cyanine dyes are particularly useful. The cyanine dyes preferably include benzothiazole, benzoxazole, and benzoselenazole dyes that include one or more thioalkyl, thioaryl, or thioether groups. Suitable visible sensitizing dyes such as those described in U.S. Pat. No. 3,719,495 (Lea), U.S. Pat. No. 4,439,520 (Kofron et al.), and U.S. Pat. No. 5,281,515 (Delprato et al.) are effective in the practice of the invention. Suitable infrared sensitizing dyes such as those described in U.S. Pat. No. 5,393,654 (Burrows et al.), U.S. Pat. No. 5,441,866 (Miller et al.) and U.S. Pat. No. 5,541,054 (Miller et al.) are also effective in the practice of this invention. A summary of generally useful spectral sensitizing dyes is contained in *Research Disclosure*, item 308119, Section IV, December, 1989. Additional classes of dyes useful for spectral sensitization, including sensitization at other wavelengths are described in *Research Disclosure*, 1994, item 36544, section V. All of the references and patents above are incorporated herein by reference.

An appropriate amount of spectral sensitizing dye added is generally about $10^{-10}$ to $10^{-1}$ mole, and preferably, about $10^{-7}$ to $10^{-2}$ mole per mole of silver halide.

Non-Photosensitive Source of Reducible Silver Ions

The non-photosensitive source of reducible silver ions used in thermographic and photothermographic materials of this invention can be any organic compound that contains reducible silver (1+) ions. Preferably, it is a silver salt that is comparatively stable to light and forms a silver image when heated to 50° C. or higher in the presence of an exposed photocatalyst (such as silver halide, when used in a photothermographic material) and a reducing composition.

Silver salts of organic acids including silver salts of long-chain carboxylic acids are preferred. The chains typically contain 10 to 30, and preferably 15 to 28, carbon atoms. Suitable organic silver salts include silver salts of organic compounds having a carboxylic acid group. Examples thereof include a silver salt of an aliphatic carboxylic acid or a silver salt of an aromatic carboxylic acid. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Preferably, at least silver behenate is used alone or in mixtures with other silver salts.

Representative examples of the silver salts of aromatic carboxylic acid and other carboxylic acid group-containing compounds include, but are not limited to, silver benzoates, a silver substituted-benzoate, such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, silver tannate, silver phthalate, silver terephthalate, silver salicylate, silver phenylacetate, and silver pyromellitate.

Silver salts of aliphatic carboxylic acids containing a thioether group as described in U.S. Pat. No. 3,330,663 (Weyde et al.) are also useful. Soluble silver carboxylates comprising hydrocarbon chains incorporating ether or thioether linkages, or sterically hindered substitution in the α- (on a hydrocarbon group) or ortho- (on an aromatic group) position, and displaying increased solubility in coating solvents and affording coatings with less light scattering can also be used. Such silver carboxylates are described in U.S. Pat. No. 5,491,059 (Whitcomb). Mixtures of any of the silver salts described herein can also be used if desired.

Silver salts of sulfonates are also useful in the practice of this invention. Such materials are described for example in U.S. Pat. No. 4,504,575 (Lee). Silver salts of sulfosuccinates are also useful as described for example in EP-A-0 227 141 (Leenders et al.).

Silver salts of compounds containing mercapto or thione groups and derivatives thereof can also be used. Preferred examples of these compounds include, but are not limited to, a heterocyclic nucleus containing 5 or 6 atoms in the ring, at least one of which is a nitrogen atom, and other atoms being carbon, oxygen, or sulfur atoms. Such heterocyclic nuclei include, but are not limited to, triazoles, oxazoles, thiazoles, thiazolines, imidazoles, diazoles, pyridines, and triazines. Representative examples of these silver salts include, but are not limited to, a silver salt of 3-mercapto-4-phenyl-1,2,4-triazole, a silver salt of 5-carboxylic-1-methyl-2-phenyl-4-thiopyridine, a silver salt of mercaptotriazine, a silver salt of 2-mercaptobenzoxazole, silver salts as described in U.S. Pat. No. 4,123,274 (Knight et al.) (for example, a silver salt of a 1,2,4-mercaptothiazole derivative, such as a silver salt of 3-amino-5-benzylthio-1, 2,4-thiazole), and a silver salt of thione compounds [such as a silver salt of 3-(2-carboxyethyl)-4-methyl-4-thiazoline-2-thione as described in U.S. Pat. No. 3,785,830 (Sullivan et al.)].

Examples of other useful silver salts of mercapto or thione substituted compounds that do not contain a heterocyclic nucleus include but are not limited to, a silver salt of thioglycolic acids such as a silver salt of an S-alkylthioglycolic acid (wherein the alkyl group has from 12 to 22 carbon atoms), a silver salt of a dithiocarboxylic acid such as a silver salt of a dithioacetic acid, and a silver salt of a thioamide.

In some embodiments, a silver salt of a compound containing an imino group is preferred, especially in aqueous-based imaging formulations. Preferred examples of these compounds include, but are not limited to, silver salts of benzotriazole and substituted derivatives thereof (for example, silver methyl-benzotriazole and silver 5-chlorobenzotriazole), silver salts of 1,2,4-triazoles or 1-H-tetrazoles such as phenylmercaptotetrazole as described in U.S. Pat. No. 4,220,709 (deMauriac), and silver salts of imidazoles and imidazole derivatives as described in U.S. Pat. No. 4,260,677 (Winslow et al.). Particularly useful silver salts of this type are the silver salts of benzotriazole and substituted derivatives thereof. A silver salt of benzotriazole is preferred in aqueous-based thermographic and photothermographic formulations.

Moreover, silver salts of acetylenes can also be used as described, for example in U.S. Pat. No. 4,761,361 (Ozaki et al.) and U.S. Pat. No. 4,775,613 (Hirai et al.).

It is also convenient to use silver half soaps. A preferred example of a silver half soap is an equimolar blend of silver carboxylate and carboxylic acid, which analyzes for about 14.5% by weight solids of silver in the blend and which is prepared by precipitation from an aqueous solution of the sodium salt of a commercial fatty carboxylic acid, or by addition of the free fatty acid to the silver soap. For transparent films a silver carboxylate full soap, containing not more than about 15% of free fatty carboxylic acid and analyzing for about 22% silver, can be used. For opaque thermographic and photothermographic materials, different amounts can be used.

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielsen et al.) and the references cited above.

Non-photosensitive sources of reducible silver ions can also be provided as core-shell silver salts such as those described in commonly assigned and copending U.S. Pat. No. 6,355,408 (Whitcomb et al.), that is incorporated herein by reference. These silver salts include a core comprised of one or more silver salts and a shell having one or more different silver salts.

Still another useful source of non-photosensitive reducible silver ions in the practice of this invention are the silver dimer compounds that comprise two different silver salts as described in U.S. Pat. No. 6,472,131 (Whitcomb), that is incorporated herein by reference. Such non-photosensitive silver dimer compounds comprise two different silver salts, provided that when the two different silver salts comprise straight-chain, saturated hydrocarbon groups as the silver coordinating ligands, those ligands differ by at least 6 carbon atoms.

As one skilled in the art would understand, the non-photosensitive source of reducible silver ions can include various mixtures of the various silver salt compounds described herein, in any desirable proportions.

When used in photothermographic materials, the photocatalyst and the non-photosensitive source of reducible silver ions must be in catalytic proximity (that is, reactive association). It is preferred that these reactive components be present in the same emulsion layer.

The one or more non-photosensitive sources of reducible silver ions are preferably present in an amount of about 5% by weight to about 70% by weight, and more preferably, about 10% to about 50% by weight, based on the total dry weight of the emulsion layers. Stated another way, the amount of the sources of reducible silver ions is generally present in an amount of from about 0.001 to about 0.2 mol/m$^2$ of the dry photothermographic material, and preferably from about 0.01 to about 0.05 mol/m$^2$ of that material.

The total amount of silver (from all silver sources) in the thermographic and photothermographic materials is generally at least 0.002 mol/m$^2$ and preferably from about 0.01 to about 0.05 mol/m$^2$.

Reducing Agents

The reducing agent (or reducing agent composition comprising two or more components) for the source of reducible silver ions can be any material, preferably an organic material, that can reduce silver (1+) ion to metallic silver.

Conventional photographic developers can be used as reducing agents, including aromatic di- and tri-hydroxy compounds (such as hydroquinones, gallatic acid and gallic acid derivatives, catechols, and pyrogallols), aminophenols (for example, N-methylaminophenol), p-phenylenediamines, alkoxynaphthols (for example, 4-methoxy-1-naphthol), pyrazolidin-3-one type reducing agents (for example PHENIDONE®), pyrazolin-5-ones, polyhydroxy spiro-bis-indanes, indan-1,3-dione derivatives, hydroxytetrone acids, hydroxytetronimides, hydroxylamine derivatives such as for example those described in U.S. Pat. No. 4,082,901, hydrazine derivatives, hindered phenols, amidoximes, azines, reductones (for example, ascorbic acid and ascorbic acid derivatives), leuco dyes, and other materials readily apparent to one skilled in the art.

When used with a silver benzotriazole silver source, ascorbic acid reducing agents are preferred. An "ascorbic acid" reducing agent (also referred to as a developer or developing agent) means ascorbic acid, complexes, and derivatives thereof. Ascorbic acid developing agents are described in a considerable number of publications in photographic processes, including U.S. Pat. No. 5,236,816 (Purol et al.) and references cited therein. Useful ascorbic acid developing agents include ascorbic acid and the analogues, isomers and derivatives thereof. Such compounds include, but are not limited to, D- or L-ascorbic acid, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, glucohepto-ascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in U.S. Pat. No. 5,498,511 (Yamashita et al.), EP-A-0 585,792 (Passarella et al.), EP-A-0 573 700 (Lingier et al.), EP-A-0 588 408 (Hieronymus et al.), U.S. Pat. No. 5,089,819 (Knapp), U.S. Pat. No. 5,278,035 (Knapp), U.S. Pat. No. 5,384,232 (Bishop et al.), U.S. Pat. No. 5,376,510 (Parker et al.), Japanese Kokai 7-56286 (Toyoda), U.S. Pat. No. 2,688,549 (James et al.), and *Research Disclosure*, item 37152, March 1995. D-, L-, or D,L-ascorbic acid (and alkali metal salts thereof) or isoascorbic acid (or alkali metal salts thereof) are preferred. Sodium ascorbate and sodium isoascorbate are most preferred. Mixtures of these developing agents can be used if desired.

When used with a silver carboxylate silver source in a photo-thermographic material, hindered phenolic reducing agents are preferred. In some instances, the reducing agent composition comprises two or more components such as a hindered phenol developer and a co-developer that can be chosen from the various classes of reducing agents described below. Ternary developer mixtures involving the further addition of contrast enhancing agents are also useful. Such contrast enhancing agents can be chosen from the various classes of reducing agents described below.

Hindered phenol reducing agents are preferred (alone or in combination with one or more high-contrast co-developing agents and co-developer contrast enhancing agents). These are compounds that contain only one hydroxy group on a given phenyl ring and have at least one additional substituent located ortho to the hydroxy group. Hindered phenol developers may contain more than one hydroxy group as long as each hydroxy group is located on different phenyl rings. Hindered phenol developers include, for example, binaphthols (that is dihydroxybinaphthyls), biphenols (that is dihydroxy-bisphenyls), bis(hydroxynaphthyl) methanes, bis(hydroxyphenyl)methanes (that is bisphenols), hindered phenols, and hindered naphthols, each of which may be variously substituted.

Representative binaphthols include, but are not limited, to 1,1'-bi-2-naphthol, 1,1'-bi-4-methyl-2-naphthol and 6,6'-dibromo-bi-2-naphthol. For additional compounds see U.S. Pat. No. 3,094,417 (Workman) and U.S. Pat. No. 5,262,295 (Tanaka et al.), both incorporated herein by reference.

Representative biphenols include, but are not limited, to 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3,3 '-di-t-butyl-5,5'-dichlorobiphenyl, 2-(2-hydroxy-3-t-butyl-5-methylphenyl)-4-methyl-6-n-hexylphenol, 4,4'-dihydroxy-3,3',5,5'-tetra-t-butylbiphenyl and 4,4'- dihydroxy-3,3',5,5'-tetramethylbiphenyl. For additional compounds see U.S. Pat. No. 5,262,295 (noted above).

Representative bis(hydroxynaphthyl)methanes include, but are not limited to, 4,4'-methylenebis(2-methyl-1-naphthol). For additional compounds see U.S. Pat. No. 5,262,295 (noted above).

Representative bis(hydroxyphenyl)methanes include, but are not limited to, bis(2-hydroxy-3-t-butyl-5-methylphenyl) methane (CAO-5), 1,1'-bis(2-hydroxy-3,5-dimethylphenyl)-3,5,5-trimethylhexane (NONOX® or PERMANAX WSO), 1,1'-bis(3,5-di-t-butyl-4-hydroxyphenyl)methane, 2,2'-bis(4-hydroxy-3-methylphenyl)propane, 4,4'-ethylidene-bis(2-t-butyl-6-methylphenol), 2,2'-isobutylidene-bis(4,6-dimethylphenol) (LOWINOX® 221B46), and 2,2'-bis(3,5-dimethyl-4-hydroxyphenyl)propane. For additional compounds see U.S. Pat. No. 5,262,295 (noted above).

Representative hindered phenols include, but are not limited to, 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include, but are not limited to, 1-naphthol, 4-methyl-1-naphthol, 4-methoxy-1-naphthol, 4-chloro-1-naphthol and 2-methyl-1-naphthol. For additional compounds see U.S. Pat. No. 5,262,295 (noted above).

More specific alternative reducing agents that have been disclosed in dry silver systems including amidoximes such as phenylamidoxime, 2-thienylamidoxime and p-phenoxyphenylamidoxime, azines (for example, 4-hydroxy-3,5-dimethoxybenzaldehydrazine), a combination of aliphatic carboxylic acid aryl hydrazides and ascorbic acid [such as 2,2'-bis(hydroxymethyl)-propionyl-β-phenyl hydrazide in combination with ascorbic acid], a combination of polyhydroxybenzene and hydroxylamine, a reductone and/or a hydrazine [for example, a combination of hydroquinone and bis(ethoxyethyl)hydroxylamine], piperidinohexose reductone or formyl-4-methylphenylhydrazine, hydroxamic acids (such as phenylhydroxamic acid, p-hydroxyphenylhydroxamic acid, and o-alaninehydroxamic acid), a combination of azines and sulfonamidophenols (for example, phenothiazine and 2,6-dichloro-4-benzenesulfonamidophenol), α-cyanophenylacetic acid derivatives (such as ethyl a-cyano-2-methylphenylacetate and ethyl α-cyanophenylacetate), bis-o-naphthols [such as 2,2'-dihydroxyl-1-binaphthyl, 6,6'-dibromo-2,2'-dihydroxy-1,1'-binaphthyl, and bis(2-hydroxy-1-naphthyl)methane], a combination of bis-o-naphthol and a 1,3-dihydroxybenzene derivative (for example, 2,4-dihydroxybenzophenone or 2,4-dihydroxyacetophenone), 5-pyrazolones such as 3-methyl-1-phenyl-5-pyrazolone, reductones (such as dimethylaminohexose reductone, anhydrodihydro-aminohexose reductone and anhydrodihydro-piperidone-hexose reductone), sulfonamidophenol reducing agents (such as 2,6-dichloro-4-benzenesulfonamido-phenol, and p-benzenesulfonamidophenol), indane-1,3-diones (such as 2-phenylindane-1,3-dione), chromans (such as 2,2-dimethyl-7-t-butyl-6-hydroxychroman), 1,4-dihydropyridines (such as 2,6-dimethoxy-3,5-dicarbethoxy-1,4-dihydropyridine), ascorbic acid derivatives (such as 1-ascorbyl-palmitate, ascorbylstearate and unsaturated aldehydes and ketones), and 3-pyrazolidones.

An additional class of reducing agents that can be used as developers are substituted hydrazines including the sulfonyl hydrazides described in U.S. Pat. No. 5,464,738 (Lynch et al.). Still other useful reducing agents are described, for example, in U.S. Pat. No. 3,074,809 (Owen), U.S. Pat. No. 3,094,417 (Workman), U.S. Pat. No. 3,080,254 (Grant, Jr.) and U.S. Pat. No. 3,887,417 (Klein et al.). Auxiliary reducing agents may be useful as described in U.S. Pat. No. 5,981,151 (Leenders et al.). All of these patents are incorporated herein by reference. Useful co-developer reducing agents can also be used as described for example, in U.S. Pat. No. 6.387.605 (Lynch et al.), incorporated herein by reference. Examples of these compounds include, but are not limited to, 2,5-dioxo-cyclopentane carboxaldehydes, 5-(hydroxymethylene)-2,2-dimethyl-1,3-dioxane-4,6-diones, 5-(hydroxymethylene)-1,3-dialkylbarbituric acids, and 2-(ethoxymethylene)-1H-indene-1,3(2H)-diones.

Additional classes of reducing agents that can be used as co-developers are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional developers are described in U.S. Pat. No. 6,100,022 (Inoue et al.). All of the patents above are incorporated herein by reference.

Yet another class of co-developers includes substituted acrylonitrile compounds that are described in U.S. Pat. No. 5,635,339 (Murray) and U.S. Pat. No. 5,545,515 (Murray et al.), both incorporated herein by reference. Examples of such compounds include, but are not limited to, the compounds identified as HET-01 and HET-02 in U.S. Pat. No. 5,635,339 (noted above) and CN-01 through CN-13 in U.S. Pat. No. 5,545,515 (noted above). Particularly useful compounds of this type are (hydroxymethylene)cyanoacetates and their metal salts.

Various contrast enhancing agents can be used in some photothermographic materials with specific co-developers. Examples of useful contrast enhancing agents include, but are not limited to, hydroxylamines (including hydroxylamine and alkyl- and aryl-substituted derivatives thereof), alkanolamines and ammonium phthalamate compounds as described for example, in U.S. Pat. No. 5,545,505 (Simpson), hydroxamic acid compounds as described for example, in U.S. Pat. No. 5,545,507 (Simpson et al.), N-acylhydrazine compounds as described for example, in U.S. Pat. No. 5,558,983 (Simpson et al.), and hydrogen atom donor compounds as described in U.S. Pat. No. 5,637,449 (Harring et al.). All of the patents above are incorporated herein by reference.

When used with a silver carboxylate silver source in a thermographic material, preferred reducing agents are aromatic di- and tri-hydroxy compounds having at least two hydroxy groups in ortho- or para-relationship on the same aromatic nucleus. Examples are hydroquinone and substituted hydroquinones, catechols, pyrogallol, gallic acid and gallic acid esters (for example, methyl gallate, ethyl gallate, propyl gallate), and tannic acid.

Particularly preferred are reducing catechol-type reducing agents having no more than two hydroxy groups in an ortho-relationship. Preferred catechol-type reducing agents include, for example, catechol, 3-(3,4-dihydroxy-phenyl)-propionic acid, 2,3-dihydroxy-benzoic acid, 2,3-dihydroxy-benzoic acid esters, 3,4-dihydroxy-benzoic acid, and 3,4-dihydroxy-benzoic acid esters.

One particularly preferred class of catechol-type reducing agents are benzene compounds in which the benzene nucleus is substituted by no more than two hydroxy groups which are present in 2,3-position on the nucleus and have in the 1-position of the nucleus a substituent linked to the nucleus by means of a carbonyl group. Compounds of this type include 2,3-dihydroxy-benzoic acid, methyl 2,3-dihydroxy-benzoate, and ethyl 2,3-dihydroxy-benzoate.

Another particularly preferred class of catechol-type reducing agents are benzene compounds in which the benzene nucleus is substituted by no more than two hydroxy groups which are present in 3,4-position on the nucleus and have in the 1-position of the nucleus a substituent linked to the nucleus by means of a carbonyl group. Compounds of this type include, for example, 3,4-dihydroxy-benzoic acid, methyl 3,4-dihydroxy-benzoate, ethyl 3,4-dihydroxy-benzoate, 3,4-dihydroxy-benzaldehyde, and phenyl-(3,4-dihydroxyphenyl)ketone. Such compounds are described, for example, in U.S. Pat. No. 5,582,953 (Uyttendaele et al.).

Still another particularly useful class of reducing agents are polyhydroxy spiro-bis-indane compounds described as photographic tanning agents in U.S. Pat. No. 3,440,049 (Moede). Examples include 3,3,3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1'-spiro-bis-indane (called indane II).

Aromatic di- and tri-hydroxy reducing agents can also be used in combination with hindered phenol reducing agents either together or in or in combination with one or more high contrast co-developing agents and co-developer contrast-enhancing agents).

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Any co-developers may be present generally in an amount of from about 0.001% to about 1.5% (dry weight) of the emulsion layer coating.

For color imaging materials (for example, monochrome, dichrome, or full color images), one or more reducing agents can be used that can be oxidized directly or indirectly to form or release one or more dyes.

The dye-forming or releasing compound may be any colored, colorless, or lightly colored compound that can be oxidized to a colored form, or to release a preformed dye when heated, preferably to a temperature of from about 80° C. to about 250° C. for a duration of at least 1 second. When used with a dye- or image-receiving layer, the dye can diffuse through the imaging layers and interlayers into the image-receiving layer of the photothermographic material.

Leuco dyes or "blocked" leuco dyes are one class of dye-forming compounds (or "blocked" dye-forming compounds) that form and release a dye upon oxidation by silver ion to form a visible color image in the practice of the present invention. Leuco dyes are the reduced form of dyes that are generally colorless or very lightly colored in the visible region (optical density of less than 0.2). Thus, oxidation provides a color change that is from colorless to colored, an optical density increase of at least 0.2 units, or a substantial change in hue.

Representative classes of useful leuco dyes include, but are not limited to, chromogenic leuco dyes (such as indoaniline, indophenol, or azomethine dyes), imidazole leuco dyes such as 2-(3,5-di-t-butyl-4-hydroxy-phenyl)-4,5-diphenylimidazole as described for example in U.S. Pat. No. 3,985,565 (Gabrielson et al.), dyes having an azine, diazine, oxazine, or thiazine nucleus such as those described for example in U.S. Pat. No. 4,563,415 (Brown et al.), U.S. Pat. No. 4,622,395 (Bellus et al.), U.S. Pat. No. 4,710,570 (Thien), and U.S. Pat. No. 4,782,010 (Mader et al.), and benzlidene leuco compounds as described for example in U.S. Pat. No. 4,932,792 (Grieve et al.), all incorporated herein by reference. Further details about the chromogenic leuco dyes noted above can be obtained from U.S. Pat. No. 5,491,059 (noted above, Column 13) and references noted therein.

Another useful class of leuco dyes includes what are known as "aldazine" and "ketazine" leuco dyes that are described for example in U.S. Pat. No. 4,587,211 (Ishida et al.) and U.S. Pat. No. 4,795,697 (Vogel et al.), both incorporated herein by reference.

Still another useful class of dye-releasing compounds includes those that release diffusible dyes upon oxidation. These are known as preformed dye release (PDR) or redox dye release (RDR) compounds. In such compounds, the reducing agents release a mobile preformed dye upon oxidation. Examples of such compounds are described in U.S. Pat. No. 4,981,775 (Swain), incorporated herein by reference.

Further, other useful image-forming compounds are those in which the mobility of a dye moiety changes as a result of an oxidation-reduction reaction with silver halide, or a nonphotosensitive silver salt at high temperature, as described for example in JP Kokai 165,054/84.

Still further, the reducing agent can be a compound that releases a conventional photographic dye forming color coupler or developer upon oxidation as is known in the photographic art.

The dyes that are formed or released can be the same in the same or different imaging layers. A difference of at least 60 nm in reflective maximum absorbance is preferred. More preferably, this difference is from about 80 to about 100 nm. Further details about the various dye absorbance are provided in U.S. Pat. No. 5,491,059 (noted above, Col. 14).

The total amount of one or more dye- forming or releasing compound that can be incorporated into the photothermographic materials of this invention is generally from about 0.5 to about 25 weight % of the total weight of each imaging layer in which they are located. Preferably, the amount in each imaging layer is from about 1 to about 10 weight %, based on the total dry layer weight. The useful relative proportions of the leuco dyes would be readily known to a skilled worker in the art.

Other Addenda

The thermographic and photothermographic materials of this invention can also contain other additives such as shelf-life stabilizers, antifoggants, contrast enhancers, development accelerators, acutance dyes, post-processing stabilizers or stabilizer precursors, thermal solvents (also known as melt formers), and other image-modifying agents as would be readily apparent to one skilled in the art.

To further control the properties of photothermographic materials, (for example, contrast, $D_{min}$, speed, or fog), it may be preferable to add one or more heteroaromatic mercapto compounds or heteroaromatic disulfide compounds of the formulae Ar—S—M and Ar—S—S—Ar, wherein M represents a hydrogen atom or an alkali metal atom and Ar represents a heteroaromatic ring or fused heteroaromatic ring containing one or more of nitrogen, sulfur, oxygen, selenium, or tellurium atoms. Preferably, the heteroaromatic ring comprises benzimidazole, naphthimidazole, benzothiazole, naphthothiazole, benzoxazole, naphthoxazole, benzoselenazole, benzotellurazole, imidazole, oxazole, pyrazole, triazole, thiazole, thiadiazole, tetrazole, triazine, pyrimidine, pyridazine, pyrazine, pyridine, purine, quinoline, or quinazolinone. Compounds having other heteroaromatic rings and compounds providing enhanced sensitization at other wavelengths are also envisioned to be suitable. For example, heteroaromatic mercapto compounds are described as supersensitizers for infrared photothermographic materials in EP-B1-0 559 228 (Philip Jr. et al.).

The heteroaromatic ring may also carry substituents. Examples of preferred substituents are halo groups (such as bromo and chloro), hydroxy, amino, carboxy, alkyl groups (for example, of 1 or more carbon atoms and preferably 1 to 4 carbon atoms), and alkoxy groups (for example, of 1 or more carbon atoms and preferably of 1 to 4 carbon atoms).

Heteroaromatic mercapto compounds are most preferred. Examples of preferred heteroaromatic mercapto compounds are 2-mercaptobenz-imidazole, 2-mercapto-5-methylbenzimidazole, 2-mercaptobenzothiazole and 2-mercaptobenzoxazole, and mixtures thereof.

If used, a heteroaromatic mercapto compound is generally present in an emulsion layer in an amount of at least about 0.0001 mole per mole of total silver in the emulsion layer. More preferably, the heteroaromatic mercapto compound is present within a range of about 0.001 mole to about 1.0 mole, and most preferably, about 0.005 mole to about 0.2 mole, per mole of total silver.

The photothermographic materials of the present invention can be further protected against the production of fog and can be stabilized against loss of sensitivity during storage. While not necessary for the practice of the invention, it may be advantageous to add mercury (2+) salts to the emulsion layer(s) as an antifoggant. Preferred mercury (2+) salts for this purpose are mercuric acetate and mercuric bromide. Other useful mercury salts include those described in U.S. Pat. No. 2,728,663 (Allen).

Other suitable antifoggants and stabilizers that can be used alone or in combination include thiazolium salts as described in U.S. Pat. No. 2,131,038 (Staud) and U.S. Pat. No. 2,694,716 (Allen), azaindenes as described in U.S. Pat. No. 2,886,437 (Piper), triazaindolizines as described in U.S. Pat. No. 2,444,605 (Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder), compounds having —$SO_2CBr_3$ groups as described for example in U.S. Pat. No. 5,594,143 (Kirk et al.) and U.S. Pat. No. 5,374,514 (Kirk et al.), and 2-(tribromomethylsulfonyl)quinoline compounds as described in U.S. Pat. No. 5,460,938 (Kirk et al.).

Stabilizer precursor compounds capable of releasing stabilizers upon application of heat during development can also be used. Such precursor compounds are described in for example, U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzotriazoles (for example alkylsulfonylbenzotriazoles and arylsulfonylbenzotriazoles) have been found to be useful stabilizing compounds (such as for post-processing print stabilizing), as described in U.S. Pat. No. 6,171,767 (Kong et al.).

Furthermore, other specific useful antifoggants/stabilizers are described in more detail in U.S. Pat. No. 6,083,681 (Lynch et al.), incorporated herein by reference.

Other antifoggants are hydrobromic acid salts of heterocyclic compounds (such as pyridinium hydrobromide perbromide) as described, for example, in U.S. Pat. No. 5,028,523 (Skoug), benzoyl acid compounds as described, for example, in U.S. Pat. No. 4,784,939 (Pham), substituted propenenitrile compounds as described, for example, in U.S. Pat. No. 5,686,228 (Murray et al.), silyl blocked compounds as described, for example, in U.S. Pat. No. 5,358,843 (Sakizadeh et al.), vinyl sulfones as described, for example, in U.S. Pat. No. 6,143,487 (Philip, Jr. et al.), diisocyanate compounds as described, for example, in EP-A-0 600,586 (Philip, Jr. et al.), and tribromomethylketones as described, for example, in EP-A-0 600,587 (Oliff et al.).

Preferably, the photothermographic materials of this invention include one or more polyhalo antifoggants that include one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds.

Particularly useful antifoggants are polyhalo antifoggants, such as those having a —$SO_2C(X')_3$ group wherein X' represents the same or different halogen atoms.

Advantageously, the photothermographic materials of this invention also include one or more thermal solvents (or melt formers). Representative examples of such compounds include, but are not limited to, salicylanilide, phthalimide, N-hydroxyphthalimide, N-potassium-phthalimide, succinimide, N-hydroxy-1,8-naphthalimide, phthalazine, 1-(2H)-phthalazinone, 2-acetylphthalazinone, benzanilide, dimethylurea, D-sorbitol, and benzene-sulfonamide. Combinations of these compounds can also be used including a combination of succinimide and dimethylurea. Known thermal solvents are disclosed, for example, in U.S. Pat. No. 6,013,420 (Windender), U.S. Pat. No. 3,438,776 (Yudelson), U.S. Pat. No. 5,368,979 (Freedman et al.), U.S. Pat. No. 5,716,772 (Taguchi et al.), and U.S. Pat. No. 5,250,386 (Aono et al.).

It is often advantageous to include a base-release agent or base precursor in the photothermographic materials according to the invention to provide improved and more effective image development. A base-release agent or base precursor as employed herein is intended to include compounds which upon heating in the photothermographic material provide a more effective reaction between the described photosensitive silver halide, and the image-forming combination comprising a silver salt and the silver halide developing agent. Representative base-release agents or base precursors include guanidinium compounds, such as guanidinium trichloroacetate, and other compounds that are known to release a base moiety but do not adversely affect photographic silver halide materials, such as phenylsulfonyl acetates. Further details are provided in U.S. Pat. No. 4,123,274 (Knight et al.).

A range of concentration of the base-release agent or base precursor is useful in the described photothermographic materials. The optimum concentration of base-release agent or base precursor will depend upon such factors as the desired image, particular components in the photothermographic material, and processing conditions.

The use of "toners" or derivatives thereof that improve the image are highly desirable components of the thermographic and photothermographic materials of this invention. Toners are compounds that when added to the thermographic and photothermographic imaging layer shift the color of the developed silver image from yellowish-orange to brown-black or blue-black. Generally, one or more toners described herein are present in an amount of about 0.01% by weight to about 10%, and more preferably about 0.1% by weight to about 10% by weight, based on the total dry weight of the layer in which it is included. Toners may be incorporated in the photothermographic emulsion layer or in an adjacent layer.

Such compounds are well known materials in the photothermographic art, as shown in U.S. Pat. No. 3,080,254

(Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), U.S. Pat. No. 5,599,647 (Defieuw et al.) and GB 1,439,478 (AGFA).

Examples of toners include, but are not limited to, phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidinedione, naphthalimides (such as N-hydroxy-1,8-naphthalimide), cobalt complexes [such as hexaaminecobalt (3+) trifluoroacetate], mercaptans (such as 3-mercapto-1,2,4-triazole, 2,4-dimercaptopyrimidine, 3-mercapto-4,5-diphenyl-1,2,4-triazole and 2,5-dimercapto-1,3,4-thiadiazole), N-(amino-methyl)aryldicarboximides (such as (N,N-dimethylaminomethyl)phthalimide), and N-(dimethylaminomethyl)naphthalene-2,3-dicarboximide, a combination of blocked pyrazoles, isothiuronium derivatives, and certain photobleach agents [such as a combination of N,N'-hexamethylene-bis(I -carbamoyl-3,5-dimethyl-pyrazole), 1,8-(3,6-diazaoctane)bis(isothiuronium)trifluoroacetate, and 2-(tribromomethylsulfonyl benzothiazole)], merocyanine dyes {such as 3-ethyl-5-[(3-ethyl-2-benzothiazolinylidene)-1-methyl-ethylidene]-2-thio-2,4-o-azolidine-dione}, phthalazine and derivatives thereof [such as those described in U.S. Pat. No. 6,146,822 (Asanuma et al.)], phthalazinone and phthalazinone derivatives, or metal salts or these derivatives [such as 4-(1-naphthyl)phthalazinone, 6-chlorophthalazinone, 5,7-dimethoxyphthalazinone, and 2,3-dihydro-1,4-phthalazinedione], a combination of phthalazine (or derivative thereof) plus one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, rhodium complexes functioning not only as tone modifiers but also as sources of halide ion for silver halide formation in situ [such as ammonium hexachlororhodate (3+), rhodium bromide, rhodium nitrate, and potassium hexachlororhodate (3+)], benzoxazine-2,4-diones (such as 1,3-benzoxazine-2,4-dione, 8-methyl-1,3-benzoxazine-2,4-dione and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6a-tetraazapentalene and 1,4-di-(o-chlorophenyl)-3,6-dimercapto-1H,4H-2,3a,5,6a-tetraazapentalene].

Phthalazines and phthalazine derivatives [such as those described in U.S. Pat. No. 6,146,822 (noted above), incorporated herein by reference], phthalazinone, and phthalazinone derivatives are particularly useful toners.

The photothermographic materials of this invention can also include one or more image stabilizing compounds that are usually incorporated in a "backside" layer. Such compounds can include, but are not limited to, phthalazinone and its derivatives, pyridazine and its derivatives, benzoxazine and benzoxazine derivatives, benzothiazine dione and its derivatives, and quinazoline dione and its derivatives, particularly as described in U.S. Pat. No. 6,599,685 (Krong) Other useful backside image stabilizers include, but are not limited to, anthracene compounds, coumarin compounds, benzophenone compounds, benzotriazole compounds, naphthalic acid imide compounds, pyrazoline compounds, or compounds described for example, in U.S. Pat. No. 6,465,162 (Kong et al.) and GB 1,565,043 (Fuji Photo). All of these patents and patent applications are incorporated herein by reference.

Binders

The photosensitive silver halide (when used), the non-photosensitive source of reducible silver ions, the reducing agent composition, and any other imaging layer additives used in the present invention are generally added to one or more binders that are either hydrophilic or hydrophobic. Thus, either aqueous or organic solvent-based formulations can be used to prepare the thermally developable materials of this invention. Mixtures of either or both types of binders can also be used. It is preferred that the binder be selected from hydrophobic polymeric materials such as, for example, natural and synthetic resins that are sufficiently polar to hold the other ingredients in solution or suspension.

Examples of typical hydrophobic binders include, but are not limited to, polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable binders are polyvinyl butyral resins that are available as BUTVAR® B79 (Solutia, Inc.) and PIOLOFORM® BS-18 or PIOLOFORM® BL-16 (Wacker Chemical Company). Aqueous dispersions (or latexes) of hydrophobic binders may also be used.

Examples of useful hydrophilic binders include, but are not limited to, proteins and protein derivatives, gelatin and gelatin-like derivatives (hardened or unhardened, including alkali- and acid-treated gelatins, acetylated gelatin, oxidized gelatin, phthalated gelatin, and deionized gelatin), cellulosic materials such as hydroxymethyl cellulose and cellulosic esters, acrylamide/methacrylamide polymers, acrylic/methacrylic polymers polyvinyl pyrrolidones, polyvinyl alcohols, poly(vinyl lactams), polymers of sulfoalkyl acrylate or methacrylates, hydrolyzed polyvinyl acetates, polyacrylamides, polysaccharides (such as dextrans and starch ethers), and other synthetic or naturally occurring vehicles commonly known for use in aqueous-based photographic emulsions (see for example, *Research Disclosure*, Item 38957, noted above). Cationic starches can be used as a peptizer for tabular silver halide grains as described in U.S. Pat. No. 5,620,840 (Maskasky) and U.S. Pat. No. 5,667,955 (Maskasky).

Hardeners for various binders may be present if desired. Useful hardeners are well known and include diisocyanate compounds as described for example, in EP-B1-0 600 586B1 and vinyl sulfone compounds as described in U.S. Pat. No. 6,143,487, aldehydes and various other hardeners as described in U.S. Pat. No. 6,190,822 (Dickerson et al.). The hydrophilic binders used in the photothermographic materials are generally partially or fully hardened using any conventional hardener. Useful hardeners are well known and are described, for example, in T. H. James, *The Theory of the Photographic Process*, Fourth Edition, Eastman Kodak Company, Rochester, N.Y., 1977, Chapter 2, pp. 77–8.

Where the proportions and activities of the thermographic and photothermographic materials require a particular developing time and temperature, the binder(s) should be able to withstand those conditions. When a hydrophobic binder is used, it is preferred that the binder does not decompose or lose its structural integrity at 120° C. for 60 seconds. When a hydrophilic binder is used, it is preferred that the binder does not decompose or lose its structural integrity at 150° C. for 60 seconds. It is more preferred that it does not decompose or lose its structural integrity at 177° C. for 60 seconds.

The polymer binder(s) is used in an amount sufficient to carry the components dispersed therein. The effective range of amount of polymer can be appropriately determined by one skilled in the art. Preferably, a binder is used at a level of about 10% by weight to about 90% by weight, and more preferably at a level of about 20% by weight to about 70% by weight, based on the total dry weight of the layer in which it is included.

It is particularly useful in the thermally developable materials of this invention to use predominantly (more than 50% by weight of total binder weight) hydrophobic binders in both imaging and non-imaging layers on both sides of the support. In particular, the antistatic compositions described in more detail below are formulated and disposed on the support with one or more hydrophobic binders such as cellulose ester binders. Of these binders, cellulose acetate, cellulose acetate butyrate, and cellulose acetate propionate are preferred. Cellulose acetate butyrate is more preferred as the predominant binder for the conductive antistatic layers. In most preferred embodiments, cellulose acetate butyrate is the only binder in the conductive antistatic layers.

Support Materials

The photothermographic materials of this invention comprise a polymeric support that is preferably a flexible, transparent film that has any desired thickness and is composed of one or more polymeric materials, depending upon their use. The supports are generally transparent (especially if the material is used as a photomask) or at least translucent, but in some instances, opaque supports may be useful. They are required to exhibit dimensional stability during thermal development and to have suitable adhesive properties with overlying layers. Useful polymeric materials for making such supports include, but are not limited to, polyesters (such as polyethylene terephthalate and polyethylene naphthalate), cellulose acetate and other cellulose esters, polyvinyl acetal, polyolefins (such as polyethylene and polypropylene), polycarbonates, and polystyrenes (and polymers of styrene derivatives). Preferred supports are composed of polymers having good heat stability, such as polyesters and polycarbonates. Polyethylene terephthalate film is a particularly preferred support. Various support materials are described, for example, in *Research Disclosure*, August 1979, item 18431. A method of making dimensionally stable polyester films is described in *Research Disclosure*, September 1999, item 42536.

It is also useful to use supports comprising dichroic mirror layers wherein the dichroic mirror layer reflects radiation at least having the predetermined range of wavelengths to the emulsion layer and transmits radiation having wavelengths outside the predetermined range of wavelengths. Such dichroic supports are described in U.S. Pat. No. 5,795,708 (Boutet), incorporated herein by reference.

It is further useful to use transparent, multilayer, polymeric supports comprising numerous alternating layers of at least two different polymeric materials. Such multilayer polymeric supports preferably reflect at least 50% of actinic radiation in the range of wavelengths to which the photothermographic sensitive material is sensitive, and provide photothermographic materials having increased speed. Such transparent, multilayer, polymeric supports are described in U.S. Ser. No. 09/656,930 (filed Sep. 7, 2000 by Simpson, Weber, and Stacey), incorporated herein by reference.

Opaque supports can also be used, such as dyed polymeric films and resin-coated papers that are stable to high temperatures.

Support materials can contain various colorants, pigments, antihalation or acutance dyes if desired. Support materials may be treated using conventional procedures (such as corona discharge) to improve adhesion of overlying layers, or subbing or other adhesion-promoting layers can be used. Useful subbing layer formulations include those conventionally used for photographic materials such as vinylidene halide polymers.

Support materials may also be treated or annealed to reduce shrinkage and promote dimensional stability.

Photothermographic Formulations

An organic-based formulation for the thermographic and photothermographic emulsion layer(s) can be prepared by dissolving and dispersing the binder, the photocatalyst, the non-photosensitive source of reducible silver ions, the reducing composition, toner(s), and optional addenda in an organic solvent, such as toluene, 2-butanone (methyl ethyl ketone), acetone, or tetrahydrofuran.

Alternatively, the desired imaging components can be formulated with a hydrophilic binder (such as gelatin or a gelatin-derivative) in water or water-organic solvent mixtures to provide aqueous-based coating formulations.

Thermographic and photothermographic materials of the invention can contain plasticizers and lubricants such as poly(alcohols) and diols of the type described in U.S. Pat. No. 2,960,404 (Milton et al.), fatty acids or esters such as those described in U.S. Pat. No. 2,588,765 (Robijns) and U.S. Pat. No. 3,121,060 (Duane), and silicone resins such as those described in GB 955,061 (DuPont). The materials can also contain matting agents such as starch, titanium dioxide, zinc oxide, silica, and polymeric beads including beads of the type described in U.S. Pat. No. 2,992,101 (Jelley et al.) and U.S. Pat. No. 2,701,245 (Lynn). Polymeric fluorinated surfactants may also be useful in one or more layers of the imaging materials for various purposes, such as improving coatability and optical density uniformity as described in U.S. Pat. No. 5,468,603 (Kub).

EP-0 792 476 B1 (Geisler et al.) describes various means of modifying photothermographic materials to reduce what is known as the "woodgrain" effect, or uneven optical density. This effect can be reduced or eliminated by several means, including treatment of the support, adding matting agents to the topcoat, using acutance dyes in certain layers or other procedures described in the noted publication.

The thermographic and photothermographic materials of this invention can be constructed of one or more layers on a support. Single layer materials should contain the photocatalyst, the non-photosensitive source of reducible silver ions, the reducing composition, the binder, as well as optional materials such as toners, acutance dyes, coating aids and other adjuvants.

Two-layer constructions comprising a single imaging layer coating containing all the ingredients and a surface protective topcoat are generally found in the materials of this invention. However, two-layer constructions containing photocatalyst and non-photosensitive source of reducible silver ions in one imaging layer (usually the layer adjacent to the support) and the reducing composition and other ingredients in the second imaging layer or distributed between both layers are also envisioned.

Layers to promote adhesion of one layer to another in thermographic and photothermographic materials are also known, as described for example in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described for example in U.S. Pat. No. 5,928,857 (Geisler et al.).

Layers to reduce emissions from the film may also be present, including the polymeric barrier layers described in U.S. Pat. No. 6,352,819 (Kenney et al.), U.S. Pat. No. 6,352,820 (Bauer et al.), and U.S. Pat. No. 6,420,102 (Bauer et al.), all incorporated herein by reference.

Thermographic and photothermographic formulations described herein can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), U.S. Pat. No. 5,861,195 (Bhave et al.), and GB 837,095 (Ilford). A typical coating gap for the emulsion layer can be from about 10 to about 750 $\mu$m, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by a MacBeth Color Densitometer Model TD 504.

When the layers are coated simultaneously using various coating techniques, a "carrier" layer formulation comprising a single-phase mixture of the two or more polymers described above may be used. Such formulations are described in U.S. Pat. No. 6,355,405 (Ludemann et al.), incorporated herein by reference.

Mottle and other surface anomalies can be reduced in the materials of this invention by incorporation of a fluorinated polymer as described for example in U.S. Pat. No. 5,532,121 (Yonkoski et al.) or by using particular drying techniques as described, for example in U.S. Pat. No. 5,621,983 (Ludemann et al.).

Preferably, two or more layers are applied to a film support using slide coating. The first layer can be coated on top of the second layer while the second layer is still wet. The first and second fluids used to coat these layers can be the same or different solvents (or solvent mixtures).

While the first and second layers can be coated on one side of the film support, manufacturing methods can also include forming on the opposing or backside of said polymeric support, one or more additional layers, including an antihalation layer, an antistatic layer, or a layer containing a matting agent (such as silica), or a combination of such layers.

It is also contemplated that the photothermographic materials of this invention can include emulsion layers on both sides of the support and at least one infrared radiation absorbing heat-bleachable compositions as an antihalation underlayer beneath at least one emulsion layer.

To promote image sharpness, photothermographic materials according to the present invention can contain one or more layers containing acutance and/or antihalation dyes. These dyes are chosen to have absorption close to the exposure wavelength and are designed to absorb scattered light. One or more antihalation dyes may be incorporated into one or more antihalation layers according to known techniques, as an antihalation backing layer, as an antihalation underlayer, or as an antihalation overcoat. Additionally, one or more acutance dyes may be incorporated into one or more frontside layers such as the photothermographic emulsion layer, primer layer, underlayer, or topcoat layer according to known techniques. It is preferred that the photothermographic materials of this invention contain an antihalation coating on the support opposite to the side on which the emulsion and topcoat layers are coated.

Dyes useful as antihalation and acutance dyes include squaraine dyes described in U.S. Pat. No. 5,380,635 (Gomez et al.), U.S. Pat. No. 6,063,560 (Suzuki et al.), and EP-A1-1 083 459 (Kimura), the indolenine dyes described in EP-A 0342 810 (Leichter), and the cyanine dyes described in U.S. Ser. No. 10/011,892 (filed Dec. 5, 2001 by Hunt, Kong, Ramsden, and LaBelle). All of the above are incorporated herein by reference.

It is also useful in the present invention to employ compositions including acutance or antihalation dyes that will decolorize or bleach with heat during processing. Dyes and constructions employing these types of dyes are described in, for example, U.S. Pat. No. 5,135,842 (Kitchin et al.), U.S. Pat. No. 5,266,452 (Kitchin et al.), U.S. Pat. No. 5,314,795 (Helland et al.), U.S. Pat. No. 6,306,566, (Sakurada et al.), U.S. Published Application 2001-0001704 (Sakurada et al.), JP 2001-142175 (Hanyu et al.), and JP 2001-183770 (Hanye et al.). Also useful are bleaching compositions described in JP 11-302550 (Fujiwara), JP 2001-109101 (Adachi), JP 2001-51371 (Yabuki et al.), and JP 2000-029168 (Noro). All of the above are incorporated herein by reference.

Particularly useful heat-bleachable backside antihalation compositions can include an infrared radiation absorbing compound such as an oxonol dyes and various other compounds used in combination with a hexaarylbiimidazole (also known as a "HABI"), or mixtures thereof. Such HABI compounds are well known in the art, such as U.S. Pat. No. 4,196,002 (Levinson et al.), U.S. Pat. No. 5,652,091 (Perry et al.), and U.S. Pat. No. 5,672,562 (Perry et al.), all incorporated herein by reference. Examples of such heat-bleachable compositions are described for example in U.S. Pat. No. 6,558,880 (Goswami et al.) and U.S. Pat. No. 6,514,677 (Ramsden et al.) both incorporated herein by reference.

Under practical conditions of use, the compositions are heated to provide bleaching at a temperature of at least 90° C. for at least 0.5 seconds. Preferably, bleaching is carried out at a temperature of from about 100° C. to about 200° C. for from about 5 to about 20 seconds. Most preferred bleaching is carried out within 20 seconds at a temperature of from about 110° C. to about 130° C.

In preferred embodiments, the photothermographic materials of this invention include a surface protective layer on the same side of the support as the one or more thermally-developable layers, an antihalation layer on the opposite side of the support, or both a surface protective layer and an antihalation layer on their respective sides of the support.

Antistatic Compositions/Layers

The thermally developable materials of this invention include one or more antistatic or conducting layers. Such layers may contain conventional antistatic agents known in the art for this purpose such as soluble salts (for example, chlorides or nitrates), evaporated metal layers, or ionic polymers such as those described in U.S. Pat. No. 2,861,056 (Minsk) and U.S. Pat. No. 3,206,312 (Sterman et al.), or insoluble inorganic salts such as those described in U.S. Pat. No. 3,428,451 (Trevoy), electroconductive underlayers such as those described in U.S. Pat. No. 5,310,640 (Markin et al.), electronically-conductive metal antimonate particles such as those described in U.S. Pat. No. 5,368,995 (Christian et al.), and electrically-conductive metal-containing particles dispersed in a polymeric binder such as those described in EP-A-0 678 776 (Melpolder et al.).

It is essential, however, that at least one conductive layer in the thermally developable materials of this invention be formulated using an antistatic composition of the present invention. In single-sided thermally developable materials, it is preferred that this conductive layer is disposed on the backside (non-imaging side of the support). In double-sided thermally developable materials, it is preferred that this conductive layer is disposed over the one or more thermally developable layers on either or both sides of the support.

As a first essential component, the antistatic compositions of this invention comprise one or more solvents, at least 50 volume % being composed of one or more organic solvents such as methyl ethyl ketone (2-butanone, or "MEK"), methyl iso-butyl ketone ("MIBK"), tetrahydrofaran, acetone, ethanol, methanol, ethyl acetate, and mixtures of two or more of these solvents. MEK and methanol are the most preferred solvents. Some water may be present with organic solvents that are water-miscible.

The second essential component of the antistatic compositions includes one or more fluorochemicals, each of which is a reaction product of $R_f$—$CH_2CH_2$—$SO_3H$ with an amine wherein $R_f$ comprises 4 or more fully fluorinated carbon atoms. In preferred embodiments, $R_f$ comprises 4 or more even-numbered fully fluorinated carbon atoms.

In other preferred embodiments, $R_f$ comprises a fluoroaliphatic chain comprising one or more straight-chain, branched-chain, or cyclic aliphatic chains or combinations thereof that are joined together by heteroatoms or heteroatom-containing groups. Aliphatic chains include, but are not limited to, alkyl groups, alkenyl groups, alkynyl groups, cycloalkylene groups, cycloalkenylene groups, and others that would be readily apparent to one skilled in the art. All of the carbon atoms in these aliphatic chains are fully fluorinated (that is, every hydrogen atom attached to a carbon atom in the chain has been replaced by a fluorine atom). However, substituents on the various aliphatic chains need not be partially or fully fluorinated. Two or more aliphatic chains can be joined together with one or more linking groups such as, for example, oxygen or sulfur atoms to form ethers and thioethers, or with amino, imino, carbonyl, sulfoxide, carbamoyl, urea, or carbonate groups, or other such linking groups are known to those skilled in the art.

In more preferred embodiments, $R_f$ comprises a single fluoroalkyl chain comprising 6, 8, 10, 12, 14, or 16 fully fluorinated carbon atoms. Most preferably, $R_f$ comprises a single fully fluorinated fluoroalkyl chain comprising 6, 8, or 10 carbon atoms.

It is also possible to use a mixture of two or more different fluorochemicals that are prepared by reacting two or more compounds represented by $R_f$—$CH_2CH_2$—$SO_3H$ wherein the $R_f$ groups are different with the same amine. Still again, it may be useful to use a mixture of fluorochemicals wherein a first fluorochemical is a reaction product of $R_{fa}$—$CH_2CH_2$—$SO_3H$ with an amine wherein $R_{fa}$ comprises 4 or more even-numbered fully fluorinated carbon atoms, and a second fluorochemical is a reaction product of $R_{fb}$—$CH_2CH_2$—$SO_3H$ with the same or different amine wherein $R_{fb}$ comprises 4 or more even-numbered fully fluorinated carbon atoms. Thus, the mixture of fluorochemicals can be provided using a mixture of fluorinated starting materials with the same aliphatic amine, the same fluorinated starting material with a mixture of amines, or a mixture of fluorinated starting materials with a mixture of amines. In all of these instances, the preferred amines are aliphatic amines, more preferably they are aliphatic diamines, and most preferably they are polyoxyalkylene diamines.

In one particularly useful mixture, the antistatic composition comprises first and second fluorochemicals wherein the first fluorochemical is a reaction product of $R_{fa}$—$CH_2CH_2$—$SO_3H$ with an aliphatic amine wherein $R_{fa}$ comprises 6 fully fluorinated carbon atoms, and the second fluorochemical is a reaction product of $R_{fb}$—$CH_2CH_2$—$SO_3H$ with the same or different aliphatic amine wherein $R_{fb}$ comprises 8 or 10 fully fluorinated carbon atoms. Still another mixture includes fluorochemicals wherein $R_{fa}$ has 6 fully fluorinated carbon atoms and $R_{fb}$ has 8 fully fluorinated carbon atoms.

Where mixtures of fluorochemicals are used, the first and second (and additional compounds) can be mixed in any useful weight ratio. Generally, however, the first fluorochemical is present in an amount of at least 50 and preferably at least 70 weight %, and up to 99 and preferably up to 95 weight % (based on total fluorochemical weight). In one preferred embodiment, a first fluorochemical wherein $R_{fa}$ has 6 fully fluorinated carbon atoms is present in an amount of from about 85 to about 95 weight % and a second fluorochemical wherein $R_{fb}$ has 8 fully fluorinated carbon atoms is present in an amount of from about 5 to about 15 weight %.

Useful fluorinated starting materials represented by $R_f$—$CH_2CH_2$—$SO_3H$ can be obtained from a number of commercial chemical sources including E. I. DuPont de Nemours & Co. (Wilmington, Del.) under the name Zonyl® FS-62 and from ATOFINA Chemicals, Inc. (Philadelphia, Pa.) under the name FORAFAC® 1033D and from other chemical companies involved in the production or sale of fluorochemicals such as, ABCR GmbH & Co. KG (Karlsruhe, Germany), Apollo Scientific Ltd. (Derbyshire, UK), AZmax Co., Ltd. (Chiba, Japan), IndoFine Chemical Company, Inc., (Belle Mead, N.J.), Interchim S. A. (Mont Lucon Cedex, France). Another commercially available fluorochemical useful for the purpose of this invention is 1H,1H,2H,2H-perfluorooctanesulfonic acid.

A wide variety of amines can be used to prepare the fluorochemicals described herein. For example ammonia can be used. In useful embodiments, the amine is an aliphatic amine. In preferred embodiments, the amine is a polyoxyalkylene diamine. Preferred compounds comprise one or more amino groups, are non-fluorinated, and generally have a molecular weight of from about 31 to about 2000 (preferably from about 500 to about 1000). These compounds also comprise one or more straight-chain, branched-chain, or cyclic aliphatic groups, or a combination of such groups thereof that are joined together by heteroatoms or heteroatom-containing groups. Representative aliphatic groups of this type include alkylene, alkenylene, cycloalkylene, oxyalkenylene, and thioalkylene. Representative heteroatoms or heteroatom-containing groups include, for example, oxygen or sulfur atoms to form ethers and thioethers, as well as amino, imino, carbonyl, sulfoxide, carbamoyl, urea, or carbonate groups, or other such linking groups are known to those skilled in the art.

It is particularly useful if the aliphatic amines comprise two or more amino groups.

Useful aliphatic amines are mono-, di-, and tri- amines that are attached to the ends of polyoxyalkylene chains. Preferred aliphatic amines include those containing two or more amino groups that are attached to the ends of polyoxyalkylene chains that are based either on propylene oxide, ethylene oxide, or mixed ethylene/propylene oxide. Representative compounds of this type are described in U.S. Pat. No. 4,975,363 (noted above) that is incorporated herein by reference. A more preferred aliphatic amine is a polyoxyalkylenediamine. Representative aliphatic amines include polyoxyalkyleneamine, polyoxypropylenediamine, propoxylated{poly(oxypropylene)}diamine, alkylethertriamine, or ethoxylated tallow alkylamine. When such aliphatic amines are used as the reactants, at least one of the fluorinated starting material comprises $R_f$ as $C_6F_{13}$—.

Useful aliphatic amines can be obtained from a number of commercial chemical sources including Huntsman Performance Chemicals, (Houston, Tex.) under the name JEFFAMINE®. Examples of such amines include, for example:

JEFFAMINE® C-346, propoxylated{poly(oxypropylene)}diamine,

JEFFAMINE® D-230, poly(oxypropylene)diamine,

JEFFAMINE® D-400, poly(oxypropylene)diamine,

JEFFAMINE® D-2000, poly(oxypropylene)diamine,

JEFFAMINE® D-600, poly(oxyalkylene)amine,

JEFFAMINE® D-900, poly(oxyalkylene) amine,

JEFFAMINE® ED-2003, poly(oxyethylene)diamine

JEFFAMINE® EDR-148, triethyleneglycoldiamine,

JEFFAMINE® T-403, poly(oxypropylene)triamine,

JEFFAMINE® T-3000, poly(oxypropylene)triamine,

JEFFAMINE® T-5000, poly(oxypropylene)triamine

JEFFAMINE® M-270, poly(oxyethylene)amine

JEFFAMINE® M-2070, poly(oxyethylene)amine

Other useful aliphatic amines can be obtained from Akzo Nobel under the names: ARMEEN® HT (hydrogenated alkyltallowamine), DOUMEEN® (diamine), TRIAMEEN® (higher amine), ETHOMEEN® (ethoxylated amine), ETHODUMEEN® (ethoxylated diamine), and PROPOMEEN® (propoxylated amine). Examples of additional useful amines include, but are not restricted to, triethylamine, tri-n-butylamine, methylamine, di-isopropylamine, and ammonia.

Additional useful aliphatic amines can be obtained from Nitroil Europe Handels GmbH. (Hamburg, Germany) under the names PC AMINE® DA 250, PC AMINE® DA 400, PC AMINE® DA 2000, and PC AMINE® MA 3000. These materials can also be obtained in the United States from Performance Chemical International Corp. (Houston, Tex.).

The fluorochemicals useful in the practice of this invention are easily prepared by reacting solutions of the fluorochemical acid with an amine. It is convenient to add the amine to the acid and monitor the pH of the reaction mixture until a pH of approximately 7 is reached. This reaction can be carried out at any suitable temperature including room temperature and up to 50° C. If desired, the fluorochemical can be isolated by solvent removal and purified by chemical techniques known in the art. Further details of preparing antistatic materials are described later herein.

The one or more fluorochemicals are present in the noted solvents in an amount of from about 0.2 to about 3 weight % and preferably at from about 0.7 to about 1.2 weight % of active ingredients.

Preferably, the antistatic compositions of this invention include one or more hydrophobic binders. Numerous examples are described above in the "Binder" section of this specification. Also as noted above, preferred hydrophobic binders include cellulose acetate binders such as cellulose acetate and cellulose acetate butyrate especially when the support is a transparent polyester film. The amount of binder(s) in the antistatic compositions is generally a function of the viscosity required by the coating method used.

For example, when Eastman Chemical CAB 381-20 is used as a binder and coated using slide coating, then an amount of from about 6 to about 20 weight % and preferably from about 10 to about 12 weight % is useful.

The binders can be added to the antistatic compositions at any time, but preferably, they are present during the preparation of the fluorochemical (that is, during the reaction of the $R_f$—$CH_2CH_2$—$SO_3H$ with the amine) as described below.

In preferred thermographic and photothermographic materials of this invention, the weight ratio of fluorochemical to binder (such as a cellulose ester) in any of the conductive layers is from about 0.04:1 to about 0.2:1.

The antistatic compositions may also include other addenda commonly added to such formulations including, but not limited to, shelf life extenders, acutance dyes, colorants to control tint and tone, UV absorbing materials, to improve light-box stability, and coating aids such as surfactants to achieve high quality coatings, all in conventional amounts. It is also useful to add inorganic matting agents such as the polysilicic acid particles as described in U.S. Pat. No. 4,828,971 (Przezdziecki), poly(methyl methacrylate) beads as described in U.S. Pat. No. 5,310,640 (Markin et al.), or polymeric cores surrounded by a layer of colloidal inorganic particles as described in U.S. Pat. No. 5,750,328 (Melpolder et al.).

In preparing the antistatic compositions of this invention as coating formulations, it is preferred to first dissolve the binder(s) in the desired solvent(s). Addition and dispersion of any matte agents or other addenda is followed by addition of $R_f$—$CH_2CH_2$—$SO_3H$. Finally, a desired amine (such as an aliphatic amine) is added. Adequate agitation is desired throughout the reaction. Alternatively, $R_f$—$CH_2CH_2$—$SO_3H$ and amine can be added to the solvent-binder mixture simultaneously. The reaction to form the fluorochemical is generally carried out at room temperature and up to 50° C.

An advantage of preparing the antistatic compositions in this fashion is that no isolation or purification of the fluorochemical is necessary before the compositions are coated or disposed on suitable substrates. Upon addition of $R_f$—$CH_2CH_2$—$SO_3H$ and amine, the fluorochemical antistatic agent is formed "in-situ" and the antistatic composition is ready for coating as a formulation.

Thus, this invention also provides a method of preparing an antistatic composition comprising dispersing $R_f$—$CH_2CH_2$—$SO_3H$ wherein $R_f$ comprises 4 or more fully fluorinated carbon atoms and an amine in one or more solvents, at least 50 volume % being organic solvent(s), the one or more solvents further comprising one or more hydrophobic binders, and reacting the amine and $R_f$—$CH_2CH_2$—$SO_3H$ to provide a fluorochemical in an antistatic composition. In preferred embodiments, $R_f$ comprises 4 or more even-numbered fully fluorinated carbon atoms.

This invention further provides a method of coating an antistatic composition comprising:

dispersing $R_f$—$CH_2CH_2$—$SO_3H$ wherein $R_f$ comprises 4 or more fully fluorinated carbon atoms and an amine in one or more solvents, at least 50 volume % being organic solvent(s), the one or more solvents further comprising one or more hydrophobic binders, and reacting the amine and $R_f$—$CH_2CH_2$—$SO_3H$ to provide a fluorochemical in an antistatic composition, and without isolation or purification of the fluorochemical, applying the antistatic composition to a substrate, such as a suitable support as described herein, using conventional equipment and conditions. The coated composition can be overcoated and/or dried using conventional conditions and equipment.

In some embodiments of this invention, the thermally developable materials comprise a second conductive layer on the opposite side of the support as the first conductive layer. The first and second conductive layers contain the same or different reaction product fluorochemicals that are reaction products of $R_f$—$CH_2CH_2$—$SO_3H$ with an amine wherein $R_f$ comprises 4 or more fully fluorinated carbon atoms.

In some photothermographic materials of this invention, the first conductive layer is disposed only on the support opposite the one or more thermally developable imaging layers, whereas in other embodiments, it is disposed on the same side as the thermally developable imaging layers.

Imaging/Development

The thermally developable materials of the present invention can be imaged in any suitable manner consistent with the type of material using any suitable imaging source (typically some type of radiation or electronic signal for photothermographic materials and a source of thermal energy for thermographic materials). In some embodiments, the materials are sensitive to radiation in the range of from about at least 300 nm to about 1400 nm, and preferably from about 300 nm to about 850 nm.

Imaging can be achieved by exposing the photothermographic materials of this invention to a suitable source of radiation to which they are sensitive, including ultraviolet radiation, visible light, near infrared radiation and infrared radiation to provide a latent image. Suitable exposure means are well known and include sources of radiation, including: incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art, and others described in the art, such as in *Research Disclosure*, September, 1996, item 38957. Particularly useful infrared exposure means include laser diodes, including laser diodes that are modulated to increase imaging efficiency using what is known as multi-longitudinal exposure techniques as described in U.S. Pat. No. 5,780,207 (Mohapatra et al.). Other exposure techniques are described in U.S. Pat. No. 5,493,327 (McCallum et al.).

Thermal development conditions will vary, depending on the construction used but will typically involve heating the imagewise exposed material at a suitably elevated temperature. Thus, the latent image can be developed by heating the exposed material at a moderately elevated temperature of, for example, from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means such as a hot plate, a steam iron, a hot roller or a heating bath.

In some methods, the development is carried out in two steps. Thermal development takes place at a higher temperature for a shorter time (for example at about 150° C. for up to 10 seconds), followed by thermal diffusion at a lower temperature (for example at about 80° C.) in the presence of a transfer solvent.

When imaging thermographic materials of this invention, the image may be "written" simultaneously with development at a suitable temperature using a thermal stylus, a thermal print head or a laser, or by heating while in contact with a heat-absorbing material. The thermographic materials may include a dye (such as an IR-absorbing dye) to facilitate direct development by exposure to laser radiation. The dye converts absorbed radiation to heat.

Use as a Photomask

The thermographic and photothermographic materials of the present invention are sufficiently transmissive in the range of from about 350 to about 450 nm in non-imaged areas to allow their use in a method where there is a subsequent exposure of an ultraviolet or short wavelength visible radiation sensitive imageable medium. For example, imaging the materials and subsequent development affords a visible image. The heat-developed thermographic and photothermographic materials absorbs ultraviolet or short wavelength visible radiation in the areas where there is a visible image and transmit ultraviolet or short wavelength visible radiation where there is no visible image. The heat-developed materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the exposed and heat-developed photothermographic material provides an image in the imageable material. This method is particularly useful where the imageable medium comprises a printing plate and the photothermographic material serves as an imagesetting film.

The present invention also provides a method for the formation of a visible image (usually a black-and-white image) by first exposing to electromagnetic radiation and thereafter heating the inventive photothermographic material. In one embodiment, the present invention provides a method comprising:

A) imagewise exposing the photothermographic material of this invention to electromagnetic radiation to which the photocatalyst (for example, a photosensitive silver halide) of the material is sensitive, to form a latent image, and B) simultaneously or sequentially, heating the exposed material to develop the latent image into a visible image.

The photothermographic material may be exposed in step A using any source of radiation, to which it is sensitive, including: ultraviolet radiation, visible light, infrared radiation or any other infrared radiation source readily apparent to one skilled in the art.

The present invention also provides a method for the formation of a visible image (usually a black-and-white image) by thermal imaging of the inventive thermographic material. In one embodiment, the present invention provides a method comprising:

A) thermal imaging of the thermographic material of this invention to form a visible image.

This visible image prepared from either a thermographic or photothermographic material can also be used as a mask for exposure of other photosensitive imageable materials, such as graphic arts films, proofing films, printing plates and circuit board films, that are sensitive to suitable imaging radiation (for example, UV radiation). This can be done by imaging an imageable material (such as a photopolymer, a diazo material, a photoresist, or a photosensitive printing plate) through the heat-developed thermographic or photothermographic material. Thus, in some other embodiments wherein the thermographic or photothermographic material comprises a transparent support, the image-forming method further comprises:

C) positioning the exposed and heat-developed thermographic or photothermographic material between a source of imaging radiation and an imageable material that is sensitive to the imaging radiation, and D) exposing the imageable material to the imaging radiation through the visible image in the exposed and heat-developed photothermographic material to provide an image in the imageable material.

MATERIALS AND METHODS FOR THE EXAMPLES

All materials used in the following examples are readily available from standard commercial sources, such as Aldrich Chemical Co. (Milwaukee Wis.) unless otherwise specified. All percentages are by weight unless otherwise indicated. The following additional terms and materials were used.

ACRYLOID® A-21 is an acrylic copolymer available from Rohm and Haas (Philadelphia, Pa.).

BUTVAR® B-79 is a polyvinyl butyral resin available from Solutia, Inc. (St. Louis, Mo.).

CAB 171-15S and CAB 381-20 are cellulose acetate butyrate resins available from Eastman Chemical Co. (Kingsport, Tenn.).

DC 550 is a phenylmethyl polysiloxane available from Dow Corning, Corporation (Midland, Mich.).

DESMODUR® N3300 is an aliphatic hexamethylene diisocyanate available from Bayer Chemicals (Pittsburgh, Pa.).

L-9342 is a perfluorinated organic antistatic agent described in U.S. Pat. No. 4,975,363 (Cavallo et al.).

PERMANAX WSO (or NONOX®) is 1,1-bis(2-hydroxy-3,5-dimethylphenyl)-3,5,5-trimethylhexane [CAS RN=7292-14-0] and is available from St-Jean PhotoChemicals, Inc. (Quebec, Canada).

MEK is methyl ethyl ketone (or 2-butanone).

"2-MBO" is 2-mercaptobenzoxazole available from Aldrich Chemical Co. (Milwaukee, Wis.)

"PHP" is pyridinium hydrobromide perbromide.

TOXIMUL® TA-15 is an ethoxylated tallow alkylamine with approximately fifteen moles of ethylene oxide (available from Stepan Company, Northfield, Ill.).

VITEL® PE-2200 is a polyester resin available from Bostik, Inc. (Middleton, Mass.).

SERVOXYL® VPAZ 100 is a mixture of monolauryl and dilauryl esters of phosphoric acid available from Sasol North America (Houston, Tex.).

GASIL® 23F is a synthetic amorphous silicon dioxide available from INEOS Silicas (Joliet Ill.).

SMA-8 Beads are 8 μm polymeric styryl methacrylate hexanediol diacrylate beads available from 3M Company, (St. Paul, Minn.).

ZONYL® FS-62 is a mixture of perfluorohexylethylsulfonic acid [$C_6F_{13}CH_2CH_2SO_3H$] (12–18%), ammonium perfluorohexylethylsulfonate [$C_6F_{13}CH_2CH_2SO_3^-NH_4^+$] (6–9%), perfluorooctylethylsulfonic acid [$C_8F_{17}CH_2CH_2SO_3H$] (1–3%), ammonium perfluorooctylethylsulfonate [$C_8F_{17}CH_2CH_2SO_3^-NH_4^+$] (1–3%), acetic acid (1–3%), and water (60–85%). It is available from E. I. DuPont de Nemours & Co., (Wilmington, Del.). The percent solids for the sample used in the examples described below was measured on a Mettler LP16 Moisture Analyzer found to be 25%.

Perfluorohexylethylsulfonic acid [$C_6F_{13}CH_2CH_2SO_3H$] is also available form ATOFINA Chemicals, Inc. (Philadelphia, Pa.) under the name FORAFAC 1033D.

Sensitizing Dye A is

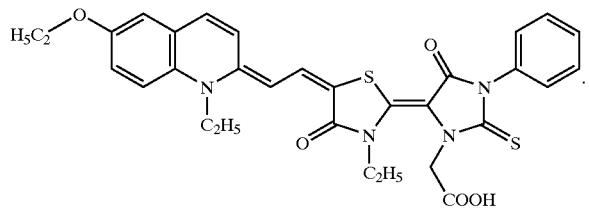

Compound HC-1 is described in U.S. Pat. No. 5,545,515 (noted above) and has the following structure:

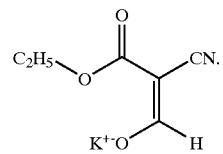

Vinyl Sulfone-1 (VS-1) is described in U.S. Pat. No. 6,143,487 and has the following structure:

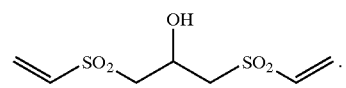

Antifoggant A is 2-(tribromomethylsulfonyl)quinoline and has the following structure:

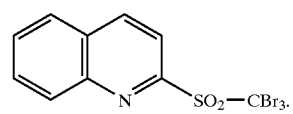

The following examples are provided to illustrate the practice of the present invention and the invention is not meant to be limited thereby.

Resistivity Measurements:

Resistivity of antistatic coatings was measured using two different methods, the "decay time" test and the "surface resistivity" test.

The decay "time test" uses an ETS Model 406D Static Decay Meter (Electro-Tech Systems Inc., Glenside, Pa.) to determine the rate of static charge decay on a sample. A sample is subjected to a fixed voltage to induce an electrostatic charge on its surface. The charge is then dissipated (bled off) by providing a path for current flow to ground. The time for the charge to dissipate to certain pre-selected levels (10% in our test) is recorded.

Decay times were measured in a room maintained at 70° F. (21.1° C.)/20% relative humidity (RH) and all testing was done in this room after samples had been acclimated for 18 dhours. A +5 kV charge was applied and the time to reach 10% of the charge (90% decay) was recorded. Samples which demonstrate poor antistatic properties do not dissipate charge and their decay times are reported as >500 seconds. In order to function as an antistatic material, a compound should provide a coating having a decay time of less than 25 seconds and preferably less than 5 seconds at a temperature of 70° F. (21.1° C.) and a relative humidity of 20%.

The "surface resistivity" test uses three Keithley instruments, a Model 247 High Voltage Supply, a Model 480 Digital Picometer, and a Model 6105 Resistivity Adapter (Keithley Instruments Inc., Cleveland Ohio).

Surface resistivity was again measured in a room maintained at 70° F. (21.1° C.)/20% relative humidity (RH) and all testing was done in this room. A potential of 500 volts was applied to the sample and the current going through the sample was measured. The conversion from amperes (conductivity) to ohm/sq (resistivity) was calculated using the following equation (provided by Kiethley):

$Ohm/sq=26,700/amperes$

The Kiethley Device cannot measure current below $1 \times 10^{-12}$ amperes. Thus resistivity greater than $2.67 \times 10^{16}$ ohm/sq cannot be calculated. Films having a resistivity calculated greater than $2.67 \times 10^{16}$ ohm/sq are reported below as $>2.67 \times 10^{16}$ ohm/sq. In order to function as an antistatic material a compound should provide a coating having a resistivity of less than $10^{14}$ ohm/sq preferably less than $10^{12}$ ohm/sq, and more preferably less than $10^{11}$ ohm/sq at a temperature of 70° F. (21.1° C.) and a relative humidity of 20%.

Preparation of Antistatic Materials

Example 1

Compound AS-1: Into a well-stirred solution of 45.84 g of ZONYL® FS-62 was added in a portion wise manner, 11.5 grams of JEFFAMINE® ED-600, a clear viscous liquid. During the addition, the reaction temperature was raised to about 35° C. and a clear solution was obtained. The final pH of the solution was measured and found to be about 7.0. The percent solid for the mixture was measured on a Mettler LP 16 Moisture Analyzer found to be 44%. The mixture was used as antistatic agent in a back coat formulation.

Additional antistatic materials were made in a similar manner by adding various amines into a solution of ZONYL® FS-62. They were evaluated for conductivity, odor, and film formation

Example 2

Compound AS-2, prepared from JEFFAMINE® ED-900 polyoxyalkyleneamine and ZONYL® FS-62.

Example 3

Compound AS-3, prepared from JEFFAMINE®D-230 polyoxypropylenediamine and ZONYL® FS-62.

Example 4

Compound AS-4, prepared from JEFFAMINE® C-346 propoxylated{poly(oxypropylene)}diamine and ZONYL® FS-62.

Example 5

Compound AS-5, prepared from JEFFAMINE® D-400 polyoxypropylenediamine and ZONYL® FS-62.

Example 6

Compound AS-6, prepared from JEFFAMINE® T-403 alkylether triamine and ZONYL® FS-62.

Example 10

Compound AS-7, prepared from triethylamine and and ZONYL® FS-62.

The structures of these materials are shown below.

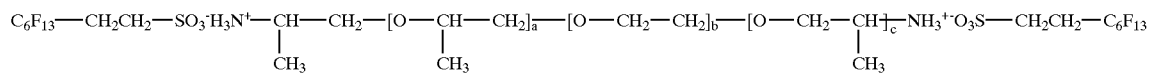

where (a + c) is approximately 2.5 and b is approximately 8.5

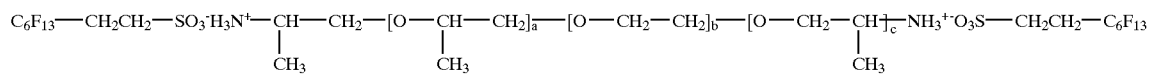

where (a + c) is approximately 2.5 and b is approximately 15.5

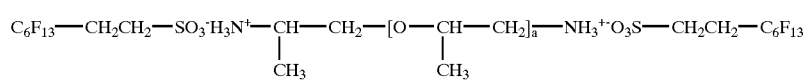

where a is approximately 2.6

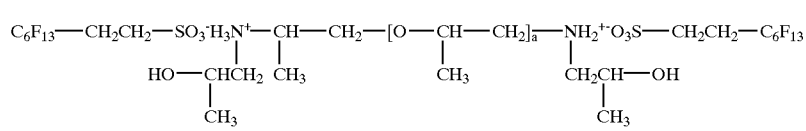

where a is approximately 2.6

-continued

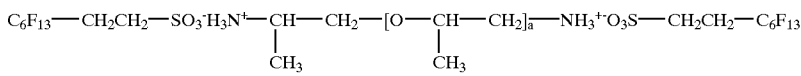

AS-5

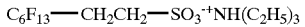

AS-7

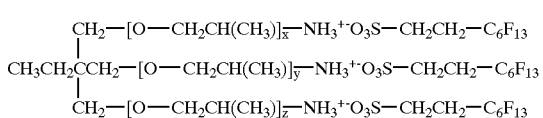

where a is approximately 5.6

AS-6 where x + y + z is approximately 5.6

Antistatic Formulations:

A coating formulation containing compound AS-1 was prepared for evaluation in an antistatic coating. An antistatic backcoat formulation was prepared in-situ by mixing the following materials with stirring:

| | |
|---|---|
| MEK | 88 g |
| CAB 381-20 | 10.98 g |
| Syloid 74X6000 | 0.14 g |
| ZONYL ® FS-62 @ 25% solids | 3.48 g |
| JEFFAMINE ® ED-600 | 0.74 g |

JEFFAMINE® ED-600 (0.74 g) was added in 46:54 weight ratio to the active ingredients of ZONYL® FS-62 (0.87 g). This amount was found to result in the solution having the desired pH of between 7 and 7.5.

In preparing the coating formulation, it is preferred to first dissolve the resin in the indicated solvents, followed by dispersing the Syloid, addition of the FS-62, and addition of the indicated JEFFAMINE®. Adequate agitation is required throughout.

The solution was knife coated onto a sheet of blue tinted poly(ethylene terephthalate) film. The coating gap was 3 mil (76 μm). The coating was dried at 95° C. for 3.5 minutes to afford an antistatic coating having a dry coating weight of 0.4 g/ft² (4.4 g/m²) Coatings with lower and higher coating weights produced coatings had similar antistatic properties.

Three concentrations of each antistatic composition were coated on a blue tinted 7 mil (178 μm) poly(ethylene terephthalate) support. The amount of fluorochemical was 1.61 g per 100 g of resin solution (that is, 0.87 g of active ingredients ZONYL® PS-62 and 0.74 g of JEFFAMINE® 100% solids), 3.23 g per 100 g of solution, and 6.76 g per 100 g of solution. The dry coating weights of fluorochemical were approximately 0.029 g/ft² (0.312 g/m²), 0.058 g/ft² (0.624 g/m²), and 0.116 g/ft² (1.25 g/m²), respectively. These were based on coating weights of 0.4 g/ft² (4.31 g/m²). These are referred to herein as "1X", "2X", and "4X" concentrations, respectively, for both Inventive and Control compositions.

Coating compositions incorporating Compounds AS-2 to AS-6 were prepared in a similar fashion using the stoichiometric amounts of amine and fluorochemical acid.

The data, shown below in Table I, demonstrate that coatings containing antistatic materials of the invention (Examples 1 to 6) have acceptable decay times at all coating weights. Control samples (Control A) prepared in an identical manner but containing only ZONYL® FS-62 showed unacceptably high resistivity at both the 1X and 2X levels.

TABLE I

| Example | "Active" Ingredient | ETS Decay Time (sec) |
|---|---|---|
| Control A-1 | 1X | >500 |
| Control A-2 | 2X | >500 |
| Control A-3 | 4X | 0.01 |
| 1-1 | 1X | 0.79 |
| 1-2 | 2X | 0.16 |
| 1-3 | 4X | 0.99 |
| 2-1 | 1X | 41 |
| 2-2 | 2X | 0.33 |
| 2-3 | 4X | 0.05 |
| 3-1 | 1X | 0.99 |
| 3-2 | 2X | 0.35 |
| 3-3 | 4X | 0.17 |
| 4-1 | 1X | 1.82 |
| 4-2 | 2X | 0.85 |
| 4-3 | 4X | 0.29 |
| 5-1 | 1X | 23.9 |
| 5-2 | 2X | 0.17 |
| 5-3 | 4X | 0.03 |
| 6-1 | 1X | 18.2 |
| 6-2 | 2X | 5.5 |
| 6-3 | 4X | 2.7 |

The results, shown in TABLE I, were confirmed using the Surface Resistivity method. The data, shown below in Table II, demonstrate that coatings containing antistatic materials of the invention (Examples 1 to 6) have acceptable surface resistivity at all coating weights. Control samples (Control A) prepared in an identical manner but containing only ZONYL® FS-62 showed unacceptably high resistivity at both the 1X and 2X levels.

TABLE II

| Example | "Active" Ingredient | Surface Resistivity (ohm/sq) |
|---|---|---|
| Control A-1 | 1X | >2.67 × $10^{16}$ |
| Control A-2 | 2X | >2.67 × $10^{16}$ |
| Control A-3 | 4X | 5.56 × $10^{9}$ |
| 1-1 | 1X | 1.91 × $10^{12}$ |
| 1-2 | 2X | 4.45 × $10^{11}$ |
| 1-3 | 4X | 9.89 × $10^{10}$ |
| 2-1 | 1X | 8.90 × $10^{12}$ |
| 2-2 | 2X | 4.45 × $10^{11}$ |
| 2-3 | 4X | 5.56 × $10^{10}$ |
| 3-1 | 1X | 2.05 × $10^{12}$ |
| 3-2 | 2X | 6.07 × $10^{11}$ |
| 3-3 | 4X | 2.87 × $10^{11}$ |
| 4-1 | 1X | 2.84 × $10^{12}$ |
| 4-2 | 2X | 1.78 × $10^{12}$ |
| 4-3 | 4X | 4.60 × $10^{11}$ |
| 5-1 | 1X | 3.81 × $10^{12}$ |

TABLE II-continued

| Example | "Active" Ingredient | Surface Resistivity (ohm/sq) |
|---|---|---|
| 5-2 | 2X | $1.91 \times 10^{11}$ |
| 5-3 | 4X | $3.81 \times 10^{10}$ |
| 6-1 | 1X | $2.23 \times 10^{13}$ |
| 6-2 | 2X | $6.68 \times 10^{12}$ |
| 6-3 | 4X | $4.45 \times 10^{12}$ |

When a thermally developable material is stored before use, it should remain static free. Because it is not uncommon for a thermally developed film to be looked at even seven years after imaging it should remain static free after prolonged storage. Evaluation of samples of antistatic coatings after storage for 7 days at 120° F. (48.8° C.) and 50% RH have been found to be predictive of how well an antistatic coating will retain its antistatic properties over a long period of time, both before and after imaging.

Samples prepared above were stored for 7 days at 120° F. (48.8° C.) and 50% RH. Their surface resistivity was then measured. The results, shown below in TABLE III, demonstrate that coatings containing antistatic materials of the invention (Examples 1 to 6) have acceptable surface resistivity after accelerated aging at all coating weights. Control samples (Control A) prepared in an identical manner but containing only ZONYL® FS-62 showed acceptably resistivity only at the 4X level.

TABLE III

| Example | "Active" Ingredient | "Aged" Surface Resistivity (ohm/sq) |
|---|---|---|
| Control A-1 | 1X | $>2.67 \times 10^{16}$ |
| Control A-2 | 2X | $>2.67 \times 10^{16}$ |
| Control A-3 | 4X | $2.52 \times 10^{11}$ |
| 1-1 | 1X | $4.85 \times 10^{12}$ |
| 1-2 | 2X | $5.34 \times 10^{11}$ |
| 1-3 | 4X | $1.11 \times 10^{11}$ |
| 2-1 | 1X | $8.90 \times 10^{13}$ |
| 2-2 | 2X | $8.90 \times 10^{13}$ |
| 2-3 | 4X | $2.21 \times 10^{11}$ |
| 3-1 | 1X | $2.38 \times 10^{12}$ |
| 3-2 | 2X | $1.1 \times 10^{12}$ |
| 3-3 | 4X | $7.63 \times 10^{11}$ |
| 4-1 | 1X | $6.21 \times 10^{12}$ |
| 4-2 | 2X | $2.67 \times 10^{12}$ |
| 4-3 | 4X | $7.63 \times 10^{11}$ |
| 5-1 | 1X | $6.88 \times 10^{13}$ |
| 5-2 | 2X | $2.05 \times 10^{13}$ |
| 5-3 | 4X | $7.63 \times 10^{10}$ |
| 6-1 | 1X | $8.90 \times 10^{13}$ |
| 6-2 | 2X | $2.05 \times 10^{13}$ |
| 6-3 | 4X | $1.78 \times 10^{13}$ |

Still another improvement achieved with the antistatic compositions of this invention is a reduction of the odor of butyric acid caused by acid catalyzed hydrolysis of the cellulose acetate butyrate binder. The data, shown below in TABLE IV, demonstrate that antistatic compositions of this invention (Examples 1 to 6) exhibited no odor after 24 hours or even after four weeks storage at room temperature. Control samples (Control A) prepared in an identical manner, but containing only ZONYL® FS-62 exhibited a severe odor after storage for 24 hours at room temperature.

TABLE IV

| Example | "Active" Ingredient | Observed Odor |
|---|---|---|
| Control A-1 | 1X | severe |
| Control A-2 | 2X | severe |
| Control A-3 | 4X | severe |
| 1-1 | 1X | none |
| 1-2 | 2X | none |
| 1-3 | 4X | none |
| 2-1 | 1X | none |
| 2-2 | 2X | none |
| 2-3 | 4X | none |
| 3-1 | 1X | none |
| 3-2 | 2X | none |
| 3-3 | 4X | none |
| 4-1 | 1X | none |
| 4-2 | 2X | none |
| 4-3 | 4X | none |
| 5-1 | 1X | none |
| 5-2 | 2X | none |
| 5-3 | 4X | none |
| 6-1 | 1X | none |
| 6-2 | 2X | none |
| 6-3 | 4X | none |

Still another improvement achieved by the antistatic compositions of this invention is improved film clarity upon coating and drying. The data, shown below in TABLE V, demonstrate that antistatic compositions of this invention (Examples 1 to 6) provide clean, clear films. Control samples (Control A) prepared in an identical manner, but containing only ZONYL® FS-62 exhibited a hazy, cloudy finish.

TABLE V

| Example | "Active" Ingredient | Coating Quality |
|---|---|---|
| Control A-1 | 1X | slight haze |
| Control A-2 | 2X | slight haze |
| Control A-3 | 4X | milky |
| 1-1 | 1X | clear |
| 1-2 | 2X | clear |
| 1-3 | 4X | clear |
| 2-1 | 1X | clear |
| 2-2 | 2X | clear |
| 2-3 | 4X | slight haze |
| 3-1 | 1X | clear |
| 3-2 | 2X | clear |
| 3-3 | 4X | cloudy-streaky |
| 4-1 | 1X | clear |
| 4-2 | 2X | slight haze |
| 4-3 | 4X | heavy haze |
| 5-1 | 1X | clear |
| 5-2 | 2X | clear |
| 5-3 | 4X | slight haze |
| 6-1 | 1X | clear |
| 6-2 | 2X | slight haze |
| 6-3 | 4X | slight haze |

Comparative Example

Conductivity Results of Starting Materials

The antistatic properties of the starting amine used alone was evaluated. The following coating formulation was prepared by mixing the following materials with stirring:

| | |
|---|---|
| MEK | 74.8 g |
| Methanol | 13.2 g |
| CAB 381-20 | 10.98 g |
| Syloid 74X6000 | 0.14 g |
| JEFFAMINE® ED-600 | 0.74 g |

The formulation was prepared, coated, and dried as described above. Various ratios of binder to amine were evaluated. Surface resistivity for each sample was then measured and found to be greater than $2.67 \times 10^{16}$ ohm. The results, shown below in TABLE IV, demonstrate that coatings employing only the amine have poor antistatic properties.

TABLE VI

Control B

| Example | MEK:MeOH | Surface Resistivity (ohm/sq) | Ratio of binder to antistatic agent |
|---|---|---|---|
| Control B-1 | 100:0 | >2.67 × 10$^{16}$ | 25.24:1 |
| Control B-2 | 100:0 | >2.67 × 10$^{16}$ | 16.82:1 |
| Control B-3 | 100:0 | >2.67 × 10$^{16}$ | 12.62:1 |
| Control B-4 | 100:0 | >2.67 × 10$^{16}$ | 8.41:1 |
| Control B-5 | 100:0 | >2.67 × 10$^{16}$ | 6.31:1 |

Similarly, the antistatic properties of a fluorochemical, ZONYL® FS-62, used alone, were also evaluated as an antistatic agent (Control C). This compound also failed to provide adequate conductive properties at lower concentrations. The concentration series was tried both with MEK as the solvent and with an 85:15 (weight %) mixture of MEK and methanol (MeOH). The results, shown below in Table VII indicate that only at the lowest ratio of binder to antistatic agent was acceptable conductivity observed.

MEK Solvent Formulation:

| | |
|---|---|
| MEK | 88 g |
| CAB 381-20 | 10.98 g |
| Syloid 74X6000 | 0.14 g |
| ZONYL ® FS-62 @ 25% solids | 3.48 g (0.87 g of active solids) |

MEK/Methanol (85:15 weight %) Formulation:

| | |
|---|---|
| MEK | 74.8 g |
| Methanol | 13.2 g |
| CAB 381-20 | 10.98 g |
| Syloid 74X6000 | 0.14 g |
| ZONYL ® FS-62 @ 25% solids | 3.48 g (0.87 g of active solids) |

TABLE VII

Control C

| Example | MEK:MeOH Ratio | Surface Resistivity (ohm/sq) | ETS decay time in (seconds) | Ratio of binder to antistatic agent and relative method described earlier |
|---|---|---|---|---|
| Control C-1 | 100:0 | >2.67 × 10$^{16}$ | — | 16.82:1 or 0.75X |
| Control C-2 | 100:0 | >2.67 × 10$^{16}$ | — | 12.62:1 or 1X |
| Control C-3 | 100:0 | 3.99 × 10$^{10}$ | — | 6.31:1 or 2X |
| Control C-4 | 85:15 | >2.67 × 10$^{16}$ | >500 | 25.24:1 or 0.75X |
| Control C-5 | 85:15 | >2.67 × 10$^{16}$ | >500 | 12.62:1 or 1X |
| Control C-6 | 85:15 | 3.81 × 10$^{11}$ | 0.04 | 6.31:1 or 2X |

Example 7

Antistatic formulations containing compound AS-1 having various weight ratios of binder to antistatic agent AS-1 were prepared in a manner similar to that described above in Example 1. It is desirable to have the highest ratio of binder to antistatic agent that still provides acceptable antistatic properties. The amounts of fluorochemical acid and amine were determined by adding amine to the fluorochemical acid until the pH was 7.2. For compound AS-1, this is a 54:46 mixture of fluorochemical acid to aliphatic amine. The compositions contained either MEK alone or as an 85:15 (weight %) solution of MEK and methanol. The conductivity results, shown below in TABLE VIII, demonstrate that the antistatic materials of this invention are capable of providing antistatic properties over a wide range of concentrations.

TABLE VIII

| Example | MEK:MeOH Ratio | Surface Resistivity (ohm/sq) | ETS Decay Time in seconds | Ratio of binder to antistatic agent | |
|---|---|---|---|---|---|
| 7-1 | 100/0 | 8.90 × 10$^{13}$ | — | 25.24:1 | 0.5X |
| 7-2 | 100/0 | 3.81 × 10$^{13}$ | — | 16.82:1 | 0.75X |
| 7-3 | 100/0 | 4.77 × 10$^{12}$ | — | 12.62:1 | 1X |
| 7-4 | 100/0 | 1.21 × 10$^{12}$ | — | 8.41:1 | 1.5X |
| 7-5 | 100/0 | 1.48 × 10$^{11}$ | — | 6.31:1 | 2X |
| 7-6 | 85/15 | 7 × 10$^{12}$ | 4.63 | 25.24:1 | 0.5X |
| 7-7 | 85/15 | 1.21 × 10$^{12}$ | 0.86 | 16.82:1 | 0.75X |
| 7-8 | 85/15 | 7.21 × 10$^{11}$ | 0.66 | 12.62:1 | 1X |
| 7-9 | 85/15 | 1.5 × 10$^{11}$ | 0.15 | 8.41:1 | 1.5X |
| 7-10 | 85/15 | 1.3 × 10$^{11}$ | 0.11 | 6.31:1 | 2X |

Example 8

This example demonstrates the use of a fluorochemical antistatic agent formed by the reaction of ZONYL® FS-62 and TOXIMUL® TA-15. Coatings containing this compound were prepared as described in Example 7 using cellulose acetate butyrate as the binder and a mixture of MEK:MeOH (85:15 weight %) as coating solvent. Surface resistivity measurements, shown below in TABLE IX, demonstrate the antistatic properties of this compound.

TABLE IX

| Example | MEK/MeOH | Surface Resistivity (ohm/sq) | Ratio of binder to antistatic agent |
|---|---|---|---|
| 8-1 | 85/15 | >2.67 × 10$^{16}$ | 25.24:1 |
| 8-2 | 85/15 | 1.57 × 10$^{13}$ | 16.82:1 |
| 8-3 | 85/15 | 1.27 × 10$^{12}$ | 12.62:1 |
| 8-4 | 85/15 | 5.93 × 10$^{10}$ | 8.41:1 |
| 8-5 | 85/15 | 4.45 × 10$^{10}$ | 6.31:1 |

Example 9

In this example, the amount of FS-62 was held constant and the amount of JEFFAMINE® was increased. Samples were coated out of MEK:Methanol 85:15 weight %. The ratio of binder to antistatic agent was 12.62: 1. The data, shown below in TABLE X, demonstrate that an excess of JEFFAMINE® does not destroy the antistatic properties of the material.

TABLE X

| Example | Ratio of active FS-62 to JEFFAMINE ® | Surface Resistivity (ohm/sq) |
|---|---|---|
| 9-1 | 54:46 | 6.2 × 10$^{11}$ |
| 9-2 | 20:80 | 8 × 10$^{11}$ |

Example 10

This example demonstrates the use of a fluorochemical antistatic agent formed by the reaction of ZONYL® FS-62 and triethylamine.

Coating formulations containing compound AS-7 were prepared for evaluation in an antistatic coating. An antistatic backcoat formulation was prepared in-situ by mixing the materials shown below with stirring. The pH of the final solution was between 7.0 and 7.5.

Example 10-1
MEK/Methanol (85:15 Weight %) Formulation:

| | |
|---|---|
| MEK | 74.8 g |
| Methanol | 13.2 g |
| CAB 381-20 | 10.98 g |
| Syloid 74X6000 | 0.14 g |
| ZONYL ® FS-62 @ 25% solids | 3.48 g |
| Triethylamine | 0.294 g |

Example 10-2
MEK/Methanol (85:15 Weight %) Formulation:

| | |
|---|---|
| MEK | 74.8 g |
| Methanol | 13.2 g |
| CAB 381-20 | 10.98 g |
| Syloid 74X6000 | 0.14 g |
| ZONYL ® FS-62 @ 25% solids | 3.48 g |
| Triethylamine | 0.588 g |

The formulations were coated and dried as described above. The surface resistivity of each coating was again measured as described above. The results, shown below in Table XI, indicate that only at the lowest ratio of binder to antistatic agent was acceptable conductivity observed. However, both coatings were clear and had no odor.

The antistatic properties of fluorochemical, ZONYL® FS-62, used alone were again evaluated as an antistatic agent (Control D).

MEK/Methanol (85:15 Weight %) Formulation Control D-1:

| | |
|---|---|
| MEK | 74.8 g |
| Methanol | 13.2 g |
| CAB 381-20 | 10.98 g |
| Syloid 74X6000 | 0.14 g |
| ZONYL ® FS-62 @ 25% solids | 3.48 g (0.87 g of active solids) |

MEK/Methanol (85:15 Weight %) Formulation Control D-2:

| | |
|---|---|
| MEK | 74.8 g |
| Methanol | 13.2 g |
| CAB 381-20 | 10.98 g |
| Syloid 74X6000 | 0.14 g |
| ZONYL ® FS-62 @ 25% solids | 6.96 g (1.74 g of active solids) |

The formulations were coated and dried as described above. The surface resistivity of each coating was again measured as described above. The results, shown below in Table XI indicate that only at the lowest ratio of binder to antistatic agent was acceptable conductivity observed. Additionally, coatings containing Control D were hazy and had a strong objectionable odor.

TABLE XI

| Example | Odor | Surface Resistivity (ohm/sq) | Ratio of binder to antistatic agent |
|---|---|---|---|
| 10-1 | None | $>2.67 \times 10^{16}$ | 12.62:1 |
| 10-2 | None | $2.87 \times 10^{10}$ | 6.31:1 |
| Control D-1 | Strong | $>2.67 \times 10^{16}$ | 12.62:1 |
| Control D-2 | Strong | $6.68 \times 10^{10}$ | 6.31:1 |

Example 11
Photothermographic Material

This example describes the use of the antistatic materials of this invention to prepare an antistatic backside coating of a photothermographic material.
Antistatic Backcoat Formulation:

An antistatic backcoat formulation was prepared by mixing the following materials with stirring.

| | |
|---|---|
| MEK | 74.8 parts |
| Methanol | 13.2 parts |
| CAB 381-20 | 10.98 parts |
| Syloid 74X6000 | 0.14 parts |
| ZONYL ® FS-62 @ 25% solids | 3.48 parts (0.87 parts of active solids) |
| JEFFAMINE ® ED-600 | 0.74 parts |

The antistatic backcoat formulation was coated onto a blue tinted poly(ethylene terephthalate) support. Conventional coating and drying techniques and equipment were used.

The antistatic properties of the backcoat layer was measured using the surface resistivity method described above. A resistivity of $7.6 \times 10^{11}$ ohm/sq was found indicating the coating to have antistatic properties.

Photothermographic emulsion and topcoat formulations were prepared as follows:
Photothermographic Emulsion Formulation:

A photothermographic emulsion coating formulation was prepared using a silver salt homogenate prepared as described in Col. 25 of U.S. Pat. No. 5,434,043 (noted above), incorporated herein by reference. This formulation was then prepared as described in Cols. 19–24 of U.S. Pat. No. 5,541,054 (Miller et al), also incorporated herein by reference.
Topcoat Formulation:

A topcoat formulation was prepared for application over the photothermographic emulsion formulation with the following components:

| | |
|---|---|
| MEK | 86.1 weight % |
| Vinyl sulfone | 0.35 weight % |
| Benzotriazole | 0.27 weight % |
| Silica | 0.21 weight % |
| ACRYLOID ® A-21 | 0.47 weight % |
| CAB 171-15S | 12.25 weight % |
| Antihalation dye* | 0.21 weight % |
| Ethyl-2-cyano-3-oxobutanoate | 0.23 weight % |

*This compound is 1,3-bis[2,3-dihydro-2,2-bis[[(1-oxohexyl)-oxy]methyl]-1H-perimidin-6-yl]-2,4-dihydroxy-,bis (inner salt).

The photothermographic emulsion and topcoat formulations were coated onto the side of the blue tinted poly (ethylene terephthalate) film opposite to that containing the antistatic coating. Conventional coating and drying techniques and equipment were used.

The coated and dried photothermographic elements prepared above were cut into 1.5 inch×11 inch strips (3.8 cm×27.9 cm) and exposed through a 10 cm continuous wedge with a scanning laser sensitometer incorporating an 811 nm laser diode. The total scan time for the sample was 6 seconds. The samples were developed using a heated roll processor for 15 seconds at 255° F. (124° C.). A black step-wedge image was formed.

Example 12

Thermographic Material

This example describes the use of the antistatic materials of this invention to prepare an antistatic backside coating of a thermographic material. A thermographic material was prepared as described below.

Adhesion Promoting Formulation:

An adhesion promoting carrier layer formulation was prepared with the following components:

| 2-Butanone | 86.5 weight % |
|---|---|
| BUTVAR ® B-79 | 12.15 weight % |
| VITEL ® PE 5833 | 1.35 weight % |

Silver Soap Homogenate Formulation:

A silver soap thermographic homogenate formulation was prepared with the following components.

| 2-Butanone | 75.5% |
|---|---|
| Silver Behenate | 24.0% |
| BL-16 Polyvinyl butyral | 0.5% |

The materials were mixed and homogenized by passing twice through a homogenizer at 5000 psi (352 kg/cm$^2$). The materials were cooled between the two passes.

Thermographic Emulsion Formulation:

Into a reaction kettle equipped with stirrer was added a 24.75 g of silver behenate soap prepared as described above. To the stirred soap was added 51.33 parts of MEK followed 15 minutes later by 21.27 parts of BUTVAR® B-79. Stirring was maintained for 1 hour, after which 0.96 parts of phthalazinone was added. Stirring for 15 minutes was followed by addition of 1.71 parts of 2,3-dihydroxybenzoic acid. Stirring was continued for 15 minutes.

Protective Topcoat Formulation:

Into a reaction kettle equipped with stirrer was added a 89.23 parts of MEK. Stirring was begun, and CAB-171-15S (7.43 parts) was added. Stirring was maintained for 1 hour to dissolve the CAB, after which 0.37 parts of ACRYLOID A-21 was added. Stirring continued and after dissolution of the ACRYLOID, 1.211 parts of DC-550 was added. Stirring for 15 minutes was followed by addition of a solution of 0.016 parts of VPAZ 100 in 1.6 parts of MEK. Stirring was continued for 15 minutes.

The thermographic and topcoat solutions were coated onto a sheet of blue tinted polyester using an automated dual-knife coater. The coating was dried at 185° F. (85° C.) for 4 minutes afford a thermographic material having a dry coating weight of approximately 2.6 g/ft$^2$ (28.1 g/m$^2$).

Antistatic Backcoat Formulation:

Into a reaction kettle equipped with a stirrer was added 74.8 g of MEK and 13.2 g of methanol. Stirring was begun, and 10.98 g of CAB 381–20 was added. Stirring was maintained, and after 15 minutes, 0.14 g of SYLOID 74×600 was added. Stirring continued, and after 15 minutes, 3.48 g (0.87 g net) of ZONYL® FS-62 (25% solids in water) was added. Stirring for 15 minutes was followed by addition of 0.74 g of JEFFAMINE® ED-600. Stirring continued for an additional 15 minutes.

The antistatic backcoat solution was knife coated onto a sheet of thermographic material prepared above. The coating was dried at 95° C. for 3.5 minutes to afford an antistatic coating having a dry coating weight of 0.4 g/ft$^2$ (4.4 g/m$^2$). Lower and higher coating weights also produce films with similar antistatic properties.

The antistatic properties of the backcoat layer were measured using the surface resistivity method described above. A resistivity of 7.7×10$^{11}$ ohm/sq was found indicating the coating to have antistatic properties.

A sheet of this material was printed upon imagewise using a printer employing a thermal stylus printhead. A black image was formed.

The invention has been described in detail with particular reference to certain preferred embodiments thereof, but it will be understood that variations and modifications can be effected within the spirit and scope of the invention.

We claim:

1. A thermally developable material comprising a support and having thereon at least one thermally developable layer, and a first conductive layer comprising a fluorochemical that is a reaction product of $R_f$—$CH_2CH_2$—$SO_3H$ with an amine wherein $R_f$ comprises 4 or more fully fluorinated carbon atoms.

2. The thermally developable material of claim 1 wherein said amine comprises one or more amino groups, is non-fluorinated, and has a molecular weight of from about 31 to about 2000 and $R_f$ comprises 4 or more even-numbered fully fluorinated carbon atoms.

3. The thermally developable material of claim 1 wherein $R_f$ comprises a fluoroaliphatic chain comprising one or more straight-chain, branched-chain, or cyclic aliphatic chains or combinations thereof that are joined together by heteroatoms or heteroatom-containing groups.

4. The thermally developable material of claim 2 wherein $R_f$ comprises a single fluoroalkyl chains comprising 6, 8, 10, 12, 14, or 16 fully fluorinated carbon atoms.

5. The thermally developable material of claim 2 wherein $R_f$ comprises a single fully fluorinated fluoroalkyl chain comprising 6, 8, or 10 carbon atoms.

6. The thermally developable material of claim 2 wherein said first conductive layer comprises first and second fluorochemicals wherein said first fluorochemical is a reaction product of $R_{fa}$—$CH_2CH_2$—$SO_3H$ with an amine wherein $R_{fa}$ comprises 6 fully fluorinated carbon atoms, and said second fluorochemical is a reaction product of $R_{fb}$—$CH_2CH_2$—$SO_3H$ with the same or different amine wherein $R_{fb}$ comprises 8 or 10 fully fluorinated carbon atoms.

7. The thermally developable material of claim 6 wherein said first fluorochemical is present in said first conductive layer in an amount of from about 50 to about 95 weight % based on total fluorochemical weight.

8. The thermally developable material of claim 2 wherein said aliphatic amine comprises one or more straight-chain, branched-chain, or cyclic aliphatic groups, or a combination of such groups that thereof that are joined together by heteroatoms or heteroatom-containing groups.

9. The thermally developable material of claim 2 wherein said aliphatic amine is a polyoxyalkylenediamine.

10. The thermally developable material of claim 2 wherein said first conductive layer comprises one or more fluorochemicals, each fluorochemical being a reaction product of $R_f$—$CH_2CH_2$—$SO_3H$ with a non-fluorinated polyoxyalkyleneamine comprising two or more amino groups and having a molecular weight of from about 17 to about 2000, and each $R_f$ is the same or different fully fluorinated fluoroalkyl group having 6, 8, or 10 carbon atoms.

11. The thermally developable material of claim 10 wherein said aliphatic amine is polyoxyalkyleneamine, polyoxypropylenediamine, propoxylated{poly(oxypropylene)}diamine, alkylethertriamine, or ethoxylated tallow alkylamine, and at least one $R_f$ is $C_6F_{13}$—.

12. The thermally developable material of claim 2 wherein said first conductive layer further comprises one or more hydrophobic binders.

13. The thermally developable material of claim 12 wherein at least one of said hydrophobic binders is a cellulose acetate butyrate binder.

14. The thermally developable material of claim 2 wherein said first conductive layer is disposed over said thermally developable layer on the same side of said support.

15. The photothermographic material of claim 14 that provides a black-and-white image.

16. The thermally developable material of claim 2 comprising a second conductive layer on the opposite side of said support as said first conductive layer, said first and second conductive layers containing the same or different reaction product fluorochemical that is a reaction product of $R_f$—$CH_2CH_2$—$SO_3H$ with an aliphatic amine wherein $R_f$ comprises 4 or more even-numbered fully fluorinated carbon atoms.

17. The thermally developable material of claim 2 that is a non-photosensitive thermographic material comprising a non-photosensitive source of reducible silver ions and a reducing composition for said non-photosensitive source of reducible silver ions.

18. A method of forming a visible image comprising:
  A) thermal imaging of the thermally developable material of claim 2.

19. The method of claim 18 wherein said thermographic material comprises a transparent support, and said image-forming method further comprises:
  B) positioning said thermal imaged thermographic material between a source of imaging radiation and an imageable material that is sensitive to the imaging radiation, and
  C) exposing said imageable material to the imaging radiation through the visible image in said thermal imaged thermographic material to provide an image in the imageable material.

20. A black-and-white thermographic material that comprises a support having thereon one or more thermally-developable imaging layers comprising a binder and in reactive association, a non-photosensitive source of reducible silver ions, and a reducing composition for said non-photosensitive source of reducible silver ions, and
  a first conductive layer comprising a fluorochemical that is a reaction product of $R_f$—$CH_2CH_2$—$SO_3H$ with an aliphatic amine wherein $R_f$ comprises 4 or more even-numbered fully fluorinated carbon atoms.

21. A photothermographic material that comprises a support having thereon one or more thermally developable imaging layers comprising a binder and in reactive association, a photosensitive silver halide, a non-photosensitive source of reducible silver ions, a reducing composition for said non-photosensitive source reducible silver ions, and
  a first conductive layer comprising a fluorochemical that is a reaction product of $R_f$—$CH_2CH_2$—$SO_3H$ with an amine wherein $R_f$ comprises 4 or more even-numbered fully fluorinated carbon atoms.

22. The photothermographic material of claim 21 wherein said amine comprises one or more amino groups, is non-fluorinated, and has a molecular weight of from about 31 to about 2000.

23. The photothermographic material of claim 22 wherein said first conductive layer is disposed on said support opposite said one or more thermally developable imaging layers.

24. The photothermographic material of claim 22 wherein said non-photosensitive source of reducible silver ions is a silver fatty acid carboxylate having 10 to 30 carbon atoms in the fatty acid or a mixture of said silver carboxylates.

25. The photothermographic material of claim 22 wherein said support is composed of a transparent polyester and said first conductive layer further comprises a cellulose ester binder.

26. The photothermographic material of claim 25 wherein the weight ratio of fluorochemical to cellulose ester binder in said first conductive layer is from about 0.04:1 to about 0.2:1.

27. The photothermographic material of claim 22 further comprising a protective layer over said one or more thermally-developable imaging layers, an antihalation layer on the backside of said support, or both.

28. The photothermographic material of claim 22 wherein said support is composed of a transparent polyester film, said photosensitive silver halide is a photosensitive silver bromide, silver bromoiodide, or both, said non-photosensitive source of reducible silver ions is a silver salt of an aliphatic carboxylic acid, or a mixture of such salts, at least one of which is silver behenate, said reducing composition for said non-photosensitive source reducible comprises a hindered phenol, and
  on one or both sides of said support, the same or different conductive layers each comprising a cellulose acetate butyrate binder, and the same or different fluorochemical that is a reaction product of $R_f$—$CH_2CH_2$—$SO_3H$ with a non-fluorinated polyoxyalkyleneamine comprising two or more amino groups and having a molecular weight of from about 31 to about 2000, and each $R_f$ is the same or different fully fluorinated fluoroalkyl group having 6, 8, or 10 carbon atoms.

29. A method of forming a visible image comprising:
  A) imagewise exposing the photothermographic material of claim 22 to electromagnetic radiation to form a latent image,
  B) simultaneously or sequentially, heating said exposed photothermographic material to develop said latent image into a visible image.

30. The method of claim 29 wherein said photothermographic material comprises a transparent support, and said image-forming method further comprises:
  C) positioning said exposed and heat-developed photothermographic material with the visible image therein between a source of imaging radiation and an imageable material that is sensitive to said imaging radiation, and
  D) exposing said imageable material to said imaging radiation through the visible image in said exposed and heat-developed photothermographic material to provide an image in said imageable material.

31. A black-and-white photothermographic material that comprises a support having an imaging side and a backside, and having on said imaging side a) one or more thermally developable imaging layers each comprising a binder, and in reactive association,
 a photosensitive silver bromide or silver iodobromide,
 a non-photosensitive source of reducible silver ions that includes one or more silver carboxylates at least one of which is silver behenate,
 a reducing composition for said non-photosensitive source reducible silver ions that includes at least one hindered phenol, and
 at least one toner, antifoggant, spectral sensitizing dye, or high contrast agent, or any combination thereof, b) a protective overcoat disposed over said one or more thermally developable imaging layers and c) on said backside, a first conductive layer comprising a fluorochemical that is a reaction product of $R_f$—$CH_2CH_2$—$SO_3H$ with a polyoxyalkylenediamine wherein $R_f$ comprises a single fully fluorinated fluoroalkyl chain comprising 6, 8, or 10 carbon atoms, or a mixture of two or more fluorochemicals that are reaction products of the same or different $R_f$—$CH_2CH_2$—$SO_3H$ with the same or different polyoxyalkylenediamine, and d) also on said backside, an antihalation layer disposed over said first conductive layer.

32. A black-and-white thermographic material that comprises a support having an imaging side and a backside, and having on said imaging side:

a) one or more thermally developable imaging layers each comprising a binder, and in reactive association,
 a non-photosensitive source of reducible silver ions that includes one or more silver carboxylates at least one of which is silver behenate,
 a reducing composition for said non-photosensitive source reducible silver ions that includes at least one di- or tri-hydroxy compound having
 at least two hydroxy groups in ortho- orpara- relationship on the same aromatic nucleus, at least one toner, antifoggant, or high contrast agent, or any combination thereof, b) a protective overcoat disposed over said one or more thermally developable imaging layers, and c) on said backside, a first conductive layer comprising a fluorochemical that is a reaction product of $R_f$—$CH_2CH_2$—$SO_3H$ with a polyoxyalkylenediamine wherein $R_f$ comprises a single fully fluorinated fluoroalkyl chain comprising 6, 8, or 10 carbon atoms, or a mixture of two or more fluorochemicals that are reaction products of the same or different $R_f$—$CH_2CH_2$—$SO_3H$ with the same or different polyoxyalkylenediamine.

\* \* \* \* \*